US009288620B2

(12) United States Patent
Menendez

(10) Patent No.: US 9,288,620 B2
(45) Date of Patent: Mar. 15, 2016

(54) REDUCING OVERLAPPING GEOFENCES

(71) Applicant: QUALCOMM Incorporated, San Diego, CA (US)

(72) Inventor: Jose Roberto Menendez, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/231,946

(22) Filed: Apr. 1, 2014

(65) Prior Publication Data
US 2015/0281889 A1 Oct. 1, 2015

(51) Int. Cl.
H04W 4/02 (2009.01)
G06Q 10/08 (2012.01)
H04L 29/08 (2006.01)

(52) U.S. Cl.
CPC ........... *H04W 4/021* (2013.01); *G06Q 10/0833* (2013.01); *H04L 29/08657* (2013.01)

(58) Field of Classification Search
CPC .................................................... H04W 4/021
USPC ..................................................... 455/456.1
See application file for complete search history.

(56) References Cited

U.S. PATENT DOCUMENTS

| 8,326,315 | B2 | 12/2012 | Phillips et al. | |
|---|---|---|---|---|
| 2010/0042940 | A1 | 2/2010 | Monday et al. | |
| 2012/0008526 | A1* | 1/2012 | Borghei .................. | H04W 4/08 370/254 |
| 2012/0115512 | A1 | 5/2012 | Grainger et al. | |
| 2012/0225672 | A1 | 9/2012 | Tholkes et al. | |
| 2013/0005362 | A1 | 1/2013 | Borghei | |
| 2013/0091452 | A1 | 4/2013 | Sorden et al. | |
| 2014/0057648 | A1* | 2/2014 | Lyman .................. | H04W 4/021 455/456.1 |
| 2015/0031388 | A1* | 1/2015 | Chatterjee ............. | H04W 4/021 455/456.1 |

FOREIGN PATENT DOCUMENTS

EP 1557807 A2 7/2005
WO 2014200524 A2 12/2014

OTHER PUBLICATIONS

International Search Report and Written Opinion—PCT/US2015/022304—ISA/EPO—Jul. 6, 2015.

* cited by examiner

*Primary Examiner* — Chuong A Ngo
(74) *Attorney, Agent, or Firm* — The Marbury Law Group, PLLC

(57) ABSTRACT

The various embodiments provide systems and methods for combining overlapping/geographically close geofences associated with a plurality of geofence-enabled applications operating on the same computing device into a single, blended geofence. Each geofence-enabled application may monitor the blended geofence so the plurality of geofence-enabled applications may simultaneously or near-simultaneously detect that the blended geofence has been satisfied when the computing device satisfies the blended geofence. Thus, each of the plurality of geofence-enabled application may consume the output of location-sensing radios and/or communicate with the geofence server at the same time because each of the plurality of geofence-enabled applications detects when the blended geofence is crossed at the same or nearly the same time. Thus, by blending the plurality of geofence-enabled application's geofence areas, the various embodiments may improve battery life and/or conserve resources for a small decrease in accuracy such that the overall user experience on the computing device is improved.

29 Claims, 23 Drawing Sheets

REDUCING OVERLAPPING GEOFENCES

BACKGROUND

Currently, many applications operating on computing devices (e.g., a smart phone, tablet computer, Global Positioning System ("GPS") computing device, PDA, etc.) and larger systems with computing devices embedded within them (e.g., cars, airplanes, trucks, boats, etc.) include the ability to track the location of the computing device and alert the user to information specific to the computing device's current location when the computing device enters, remains inside, leaves and/or is absent from a predetermined area or areas that are commonly known as "geofences."

The term "geofence" refers to a set of geographic coordinates defining a location, area, or boundary, which, when satisfied, initiates some associated functionality (e.g., recording the presence of the user at that place, pushing information, sending an alert, triggering an action or application, etc.) A geofence can be made up of complex polygons or lines between coordinates, and therefore the term "geofence" may be sets of points or coordinates defining a perimeter, a center point plus a radius, a vector space, and any other data structure for defining a 2D or 3D area or perimeter. A geofence may be specified by points defined by latitude, longitude, and altitude values, but the points may also be defined by a street address, intersections of roadways, etc.

Geofences may be implemented in a variety of security, advertising, asset tracking, inventory control, and various other applications or geo-based systems operating on a computing device (herein referred to as "geofence-enabled applications"). For example, a geofence-enabled application for a movie theater on a user's smartphone may alert the user of reduced ticket prices when the user walks into a shopping mall that includes that movie theater and has a geofence that encompasses portions or the entire area of the mall.

Geofence boundaries and services may be provided by a geofence server, an example of which is the Gimbal® server supported by Qualcomm. A geofence-enabled application receives the geographic characteristics/location of nearby geofence(s) from the geofence server. While executing on the computing device, the geofence-enabled application continually determines its location—for example, through the computing device's GPS receiver and/or through a Wi-Fi (e.g., pre-mapped Wi-Fi access point locations) and/or cellular connections (e.g., pre-mapped cell tower locations)—and compares its location with the location of known geofences to determine whether a geofence criterion (e.g., entering a geofence, leaving a geofence, crossing a geofence boundary, etc.) is satisfied. When the geofence-enabled application determines that a geofence criterion has been satisfied, the application may initiate a communication to the geofence server to notify the server of the geofence event, or the application may consume that geofence locally. When sent to the server, the geofence server sends the computing device some appropriate content (e.g., an advertisement or coupon) or instructions, and/or sends an updated list of geofences at that location. When consumed locally on the computing device, the geofence-enabled application may present to a user content already on the computing device (e.g. cached content related to the location, re-sorting of existing content, cached advertisement, etc) and/or may query a content server for content.

SUMMARY

The various embodiments provide systems and methods implemented in the system for combining overlapping/geographically close geofences associated with one or more geofence-enabled applications operating on the same computing device into a single, blended geofence. In an embodiment, each of the one or more geofence-enabled applications may monitor the blended geofence such that the one or more geofence-enabled applications may simultaneously or near-simultaneously detect that the blended geofence has been satisfied when the computing device crosses the blended geofence. Thus, each of the one or more geofence-enabled application may communicate with the geofence server at the same time because each of the one or more applications detects when the blended geofence is satisfied at the same or nearly the same time. Thus, by blending the one or more of geofence-enabled application's geofence areas, the various embodiments may reduce the overall amount of data, location sensing, and/or processing resources needed for the one or more geofence-enabled applications to communicate with the geofence server, thereby improving battery life and the overall user experience on the computing device.

The embodiment methods may be implemented in software and may be executed by a geofence server and/or a computing device processor executing a geofence management unit. In further embodiments, the embodiment methods may be implemented in hardware on the geofence server and/or the computing device (e.g., in the form of a hardware component or system-on-chip).

In an embodiment, providing a blended geofence to a number of geofence-enabled applications operating on the same computing device may be accomplished by the geofence server. The geofence server may be informed of all geofence-enabled applications operating on a computing device and may use this information to identify geofences that overlap or are in close proximity for the one or more geofence-enabled applications operating on the computing device. The geofence server may also draw a single, blended geofence encompassing some or all of these geofences determined to be adjacent and/or overlapping. In another embodiment, the geofence server may provide the information about the blended geofence to each of the one or more geofence-enabled applications on the computing device that is associated with a geofence included in the blended geofence, thereby causing those one or more applications to share a common geofence area.

In an embodiment, the geofence server may combine geofences into blended geofences based on the current location of the mobile computing device, such as by determining the geofences that are geographically close together at the mobile computing device's current location and blending those geofences together. In an alternative embodiment, the geofence server may combine geofences into blended geofences more generally, irrespective of the mobile device's current location. Specifically, the geofence server may be configured to generate blended geofences from groups of geofences that are determined to be geographically close to each other without regard for the current location of the computing device. Thus, in such embodiments, the geofence server may periodically generate and store a full complement of blended geofences for various geographical areas (e.g., a state or an entire region of a country) in advance and may send one or more of these stored blended geofences to the computing device as needed, such as in response to receiving a request for updated geofence information or preemptively in the form of "pushed" data sent to the computing device.

In further embodiments, the operations of generating a common, blended geofence for one or more geofence-applications executing on the same computing device may be accomplished by a computing device processor configured with processor-executable instructions to perform operations of the embodiment methods. In such embodiments, the computing device processor executing the geofence management unit may receive information regarding geofences for each of the geofence-enabled applications, such as from the geofence-enabled applications themselves or from the geofence server. Using this information, the computing device processor executing the geofence management unit may redraw/combine the geofences for one or more of these geofence-enabled applications into a single, blended geofence and may send the blended geofence to each of the geofence-enabled applications that is associated with a geofence included in the blended geofence.

In another embodiment, the processor executing the geofence management unit on the computing device may periodically create and store all possible blended geofences available (or a particular subset of all available blended geofences) for the geofence-enabled applications operating on the computing device irrespective of the mobile computing device's current location. Thus, in a further embodiment, on its own or in response to receiving a request for updated geofence information from an application on the computing device, the processor executing the geofence management unit may quickly access a stored blended geofence associated with a geofence-enabled application on the computing device and may send the stored blended geofence to that application. In other words, the processor executing the geofence management unit may prepare pre-generated blended geofences for geofence-enabled applications and may send those pre-made blended geofences to the applications as needed or requested.

In another embodiment, a geofence management unit operating on the computing device may serve as a proxy geofence server on behalf of the one or more geofence-enabled applications executing on the computing device. The geofence management unit may send a list of the geofence-enabled applications operating on the computing device to the geofence server and may receive a blended geofence in response. The geofence management unit may also monitor the location of the computing device (e.g., via GPS) to detect when the blended geofence is crossed. When the blended geofence is crossed, the computing device processor executing the geofence management unit may send a notification that the blended geofence criterion is satisfied to each geofence-enabled application executing on the computing device that is associated with a geofence included in that blended geofence. The geofence management unit may also send a notification to the geofence server. In an alternative embodiment, the geofence management unit may send the blended geofence to each of the geofences applications that is associated with a geofence included in the blended geofence, and these geofence-enabled applications may then operate as if they had received the blended geofence directly from the geofence server.

In an embodiment, the geofence server and/or the computing device processor executing the geofence management unit may determine whether geofences that are geographically close are "suitable" for blending before combining those geofences. For example, the geofence server and/or the computing device processor executing the geofence management unit may perform an analysis of the geographically close geofences to assess whether blending the geofences would result in a blended geofence that substantially degrades the location-based services of the underlying geofence-enabled applications (e.g., based on the geofences' shapes, sizes, related metadata, etc.).

In another embodiment, the geofence server and/or the computing device processor executing the geofence management unit may determine whether the geographically close geofences are permitted to be blended by the geofence-enabled applications with which they are associated. For example, during the process of defining a geofence for a particular geofence-enabled application, a geofence-enabled application's developer may specify that that geofence may not be blended with another geofence. In a further example, the geofence-enabled application may include a flag or another value that indicates to the geofence server and/or the computing device processor whether one or more geofences associated with that application are permitted to be blended.

Another embodiment is a system including the geofence server and the computing device described above in which the computing device sends a list of geofence-enable applications executing on the computing device to the geofence server, the geofence server generates a bended geofence as described above and sends the blended geofence back to the computing device for use by a geofence management unit executing on the computing device as described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
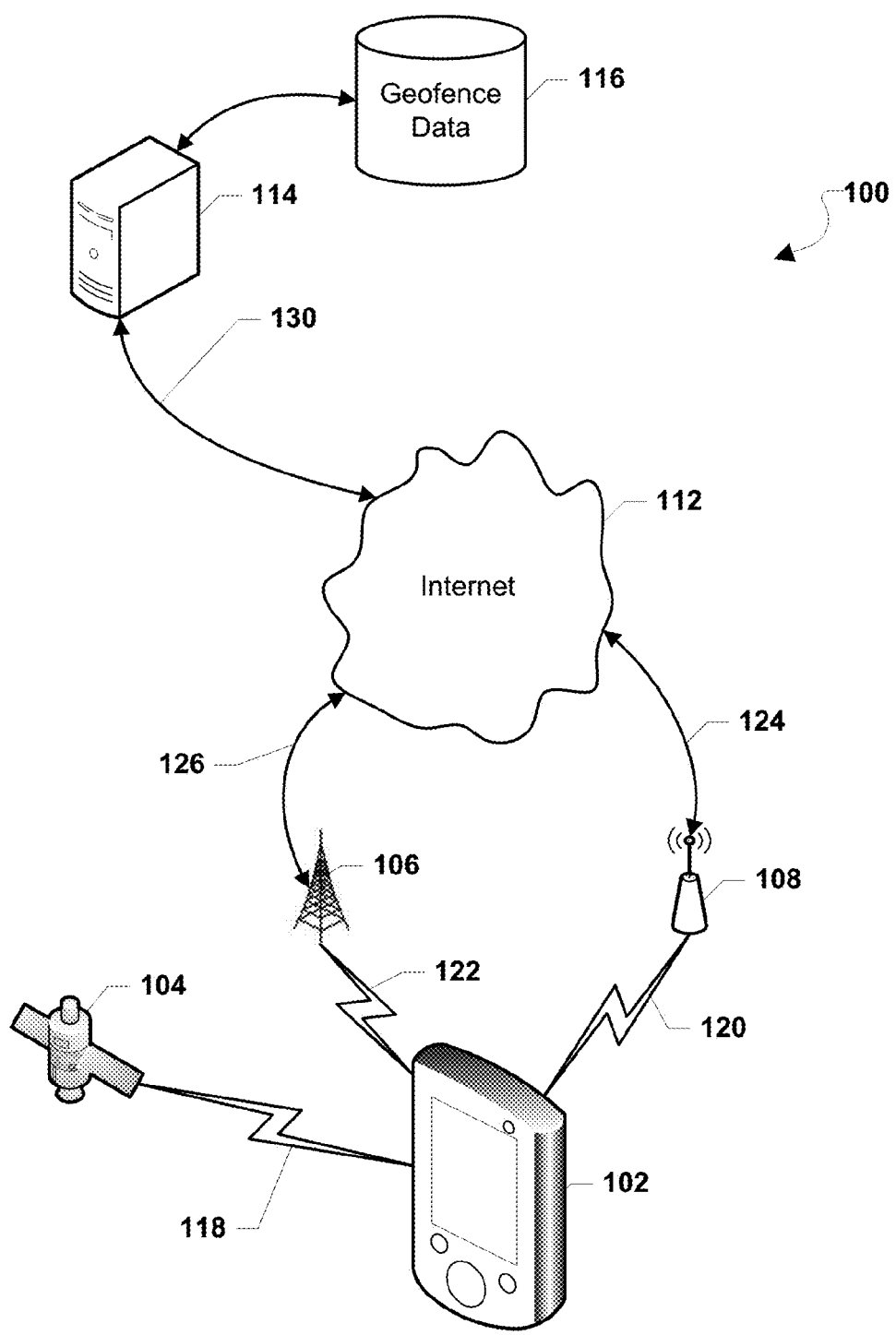
FIG. 1 is a communication system block diagram illustrating network components of an example communication system suitable for use in the various aspects.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The term "computing device" herein refers to any one or all of cellular telephones, smartphones, personal or mobile multi-media players, personal data assistants (PDA's), laptop computers, tablet computers, smartbooks, vehicle computing systems, terrestrial, marine and aviation navigation systems, ultrabooks, palm-top computers, wireless electronic mail receivers, multimedia Internet enabled cellular telephones, wireless gaming controllers, and similar personal electronic computing devices that include a memory, a programmable processor, and a GPS receiver or other means of determining the current location. The term "computing device" also includes embedded computing devices with a processor and means for determining current location included within larger computing devices or vehicles, such as computing systems and/or navigation systems integrated within bicycles, automobiles, motorcycles, aircraft, boats, ships, etc.

The term "geofence-enabled application" herein refers to an application operating on a computing device that may utilize or participate in location-based services that include geofencing. In the various embodiments, a geofence-enabled application may receive information from a geofence server and/or a geofence management unit regarding one or more geofences (e.g., the geofences' shape, area, perimeter, etc.), and in an aspect, the geofence-enabled application may use such information to monitor one or more geofences in a particular area to determine when its computing device crosses the boundary of or otherwise satisfies one of those geofences.

It is common practice to treat each geofence-enabled application separately, meaning that each geofence-enabled application operating on a computing device may be required to determine whether its geofence boundary has been satisfied regardless of whether that application's geofence boundary is in close proximity to or overlaps one or more other geofence boundaries associated with other geofence-enabled applications on the computing device. As a result of this disjointed approach to handling geofence areas in close proximity, a conventional computing device experiences significant decreases in performance, such as higher battery drain, when entering an area where there are many nearby and overlapping geofences because the computing device must track nearby or overlapping geofences simultaneously and communicate with the geofence server for each geofence crossed. This situation may also affect a single geofence-enabled application when an application developer for the application draws several overlapping or nearby geofences.

In overview, the various embodiments provide systems and methods implemented in the system for combining overlapping/geographically close geofences associated with one or more geofence-enabled applications operating on the same computing device into a single, blended geofence. In an embodiment, each of the one or more geofence-enabled applications may monitor the blended geofence such that the one or more geofence-enabled applications may simultaneously or near-simultaneously detect that the blended geofence has been satisfied when the computing device crosses the blended geofence. Thus, each of the one or more geofence-enabled application may communicate with the geofence server at the same time because each of the one or more applications detects when the blended geofence is satisfied at the same or nearly the same time. Thus, by blending the one or more of geofence-enabled application's geofence areas, the various embodiments may reduce the overall amount of data, location sensing, and/or processing resources needed for the one or more geofence-enabled applications to communicate with the geofence server, thereby improving battery life and the overall user experience on the computing device.

The embodiment methods may be implemented in software and executed by a geofence server. In further embodiments, the embodiment methods may be implemented in hardware in the form of a hardware component or system-on-chip.

In an embodiment, providing a blended geofence to a number of geofence-enabled applications operating on the same computing device may be accomplished within the geofence server. The geofence server may be informed of all geofence-enabled applications operating on a computing device (e.g., all applications registered with the geofence server) and may use this information to identify geofences that overlap or are in close proximity for one or more geofence-enabled applications operating on the computing device. The geofence server may use this information to draw a single, blended geofence encompassing some or all of the adjacent and overlapping geofences for the one or more geofence-enabled applications.

In another embodiment, the geofence server may provide the information about the blended geofence to each of the one or more geofence-enabled applications on the computing device, thereby causing the one or more applications to share a common geofence area. Because each of the one or more geofence-enabled applications shares a common geofence area, each application may simultaneously or nearly simultaneously detect that the computing device has crossed the blended geofence, enabling the computing device to report satisfying the blended geofence to the geofence server for each of the one or more geofence-enabled applications at the same or nearly the same time. As a result, the computing device may communicate with the geofence server and/or try to sense location less frequently, thereby conserving system resources and battery power.

In an embodiment, in response to receiving a geofence crossing notification from a geofence-enabled application operating on the computing device (i.e., a "reporting application"), the geofence server may determine the geofences associated with one or more of the geofence-enabled applications on the reporting application's computing device that are close in proximity (e.g., overlapping) to the computing device's current location. The geofence server may combine/redraw these geofences into a single, blended geofence area, and the geofence server may send information for the blended geofence to the reporting application. The geofence server may simultaneously or later send the same blended geofence information to other geofence-enabled applications on the same computing device, thereby eventually ensuring that each of the one or more geofence-enabled applications monitors a common geofence (i.e., the blended geofence). Thus, such embodiments may reduce the amount of time that the computing device must communicate with the geofence server and/or try to sense its computing device's location because, eventually, the one or more geofence-enabled applications may cross the blended geofence at the same time and report these crossings to the geofence server at the same or nearly the same time.

In an embodiment, the geofence server may implement various strategies for blending the overlapping geofences or geofences in close proximity of the plurality of geofence-enabled applications operating on the same computing device. In an embodiment, the geofence server may combine the overlapping/close-proximity geofences into various shapes. For example, the geofence server may form a combined shape based on the geofences perimeters, create a larger geofence that encapsulates the individual geofences, and/or determine a weighted average shape of the combined geofences. Weights may include probability of breaching a fence, size of the fence, required accuracy for the use case, required battery conservation for the use case, etc.

In further embodiments, the operations of generating a common, blended geofence for one or more geofence-applications executing on the same computing device may be accomplished by a computing device processor configured with processor-executable instructions to perform operations of the embodiment methods. In this embodiment, a geofence management unit may execute on the computing device to act as a proxy geofence server on behalf of the one or more geofence-enabled applications executing on the computing device. In this embodiment, the geofence management unit may receive information regarding geofences in the current location for each of the geofence-enabled applications, from the geofence-enabled applications themselves, or from the geofence server. Using this information, the geofence management unit may redraw/combine the geofences in the current location for one or more geofence-enabled applications into a single, blended geofence.

In an embodiment, the geofence management unit executing on a processor of the computing device may monitor the location of the computing device to detect when the blended geofence is crossed. When the blended geofence is crossed, the geofence management unit may send a notification that the geofence criterion is satisfied to each geofence-enabled application executing on the computing device. The geofence management unit may also send a notification to a geofence server. This may enable each application to act independently as if it had determined that its own geofence was crossed. Since the geofence management unit notifies the geofence-enabled applications at the same time, a single connection to the geofence server may be established to support all of the applications. In an alternative embodiment, the geofence management unit may send the redrawn geofence to each of the other geofence applications on the computing device, which may then operate as described above as if they had received the blended geofence from the geofence server.

In an embodiment, the geofence management unit may be implemented as a standalone application or software service or as part of an operating system or implemented in specialized hardware (e.g., inside the GPS chip) in the computing device, etc.

The various embodiments may be implemented within a variety of communication systems, such as the example communication system 100 illustrated in FIG. 1. The communication system 100 may include a computing device 102 that may be configured to determine its location using various techniques.

In an embodiment, the computing device 102 may include a GPS chipset configured to receive wireless communications 118 from GPS satellites 104 and may determine its current location information based on those received communications 118. The computing device 102 may also include assisted GPS (A-GPS) functionality.

In another embodiment, the computing device 102 may utilize various known local positioning systems to determine its current location, such as a Wi-Fi positioning system or a mobile-network-based positioning system. For example, the computing device 102 may be in communication with wireless access points (illustrated in FIG. 1 as a wireless access point 108) over a wireless connection 120, and the computing device 102 may determine its current location based on the known location of the wireless access point 108. In another example, the computing device 102 may similarly determine its current location based on wireless signals 122 received from a base station with a known location (such as from a base station 106).

The computing device 102 may also utilize hybrid-positioning systems in which the computing device 102 determines its location using a combination of GPS and local-positioning systems. Because GPS may be more precise in open areas but may work poorly indoors or between tall buildings, the computing device 102 may be configured to utilize GPS in combination with one or more other positioning technologies, such as cell tower signals, wireless internet signals, Bluetooth beacons, or other local positioning systems to overcome the limitations of using GPS alone. For example, the computing device 102 may use local-positioning systems based on cell tower signals, which are not hindered by buildings or inclement weather. In another example, the computing device 102 may leverage a Wi-Fi positioning systems in addition to GPS to give very exact positioning in urban areas with high Wi-Fi density.

The computing device 102 may be configured to connect to the Internet 112. For example, the computing device 102 may be configured to connect to the Internet 112 via a wireless connection 120 established through a wireless access point 108, such as a Wi-Fi access point. The wireless access point 108 may connect with the Internet 112 through a wired connection 124. Additionally, the computing device 102 and a cellular tower or base station 106 may exchange data via a cellular connection 122, which may be CDMA, TDMA, GSM, PCS, 3G, 4G, LTE, or any other type of cellular connection. The cellular tower or base station 106 may connect with the Internet 112 through a wired connection 126.

In an embodiment, the computing device 102 may include one or more geofence-enabled applications. Each of the one or more of geofence-enabled applications may manage one or more geofences (i.e., virtual perimeters associated with a real-world geographic areas) associated with that particular geofence-enabled application. Each of the one or more of geofence-enabled applications may utilize the computing device 102's positioning capabilities to determine whether the computing device 102 has crossed the perimeter of one of its geofences (i.e., satisfied the geofence). When the computing device 102 satisfied a geofence associated with a geofence-enabled application, that application may report that crossing to a geofence server 114 and request updated geofence information, such as the location of geofences near the computing device 102's current location.

In an embodiment, the geofence server 114 may be configured to manage and update geofence information for geofence-enabled applications operating on various computing devices, such as the computing device 102. The geofence server 114 may be in communication with a geofence information database 116, which may store geofence areas associated with particular geofence-enabled applications. The geofence server 114 may connect to the Internet 112 through a wired connection 130 and thus may be capable of receiving geofence information requests from and sending updated geofence information to geofence-enabled applications.

Figure 2:
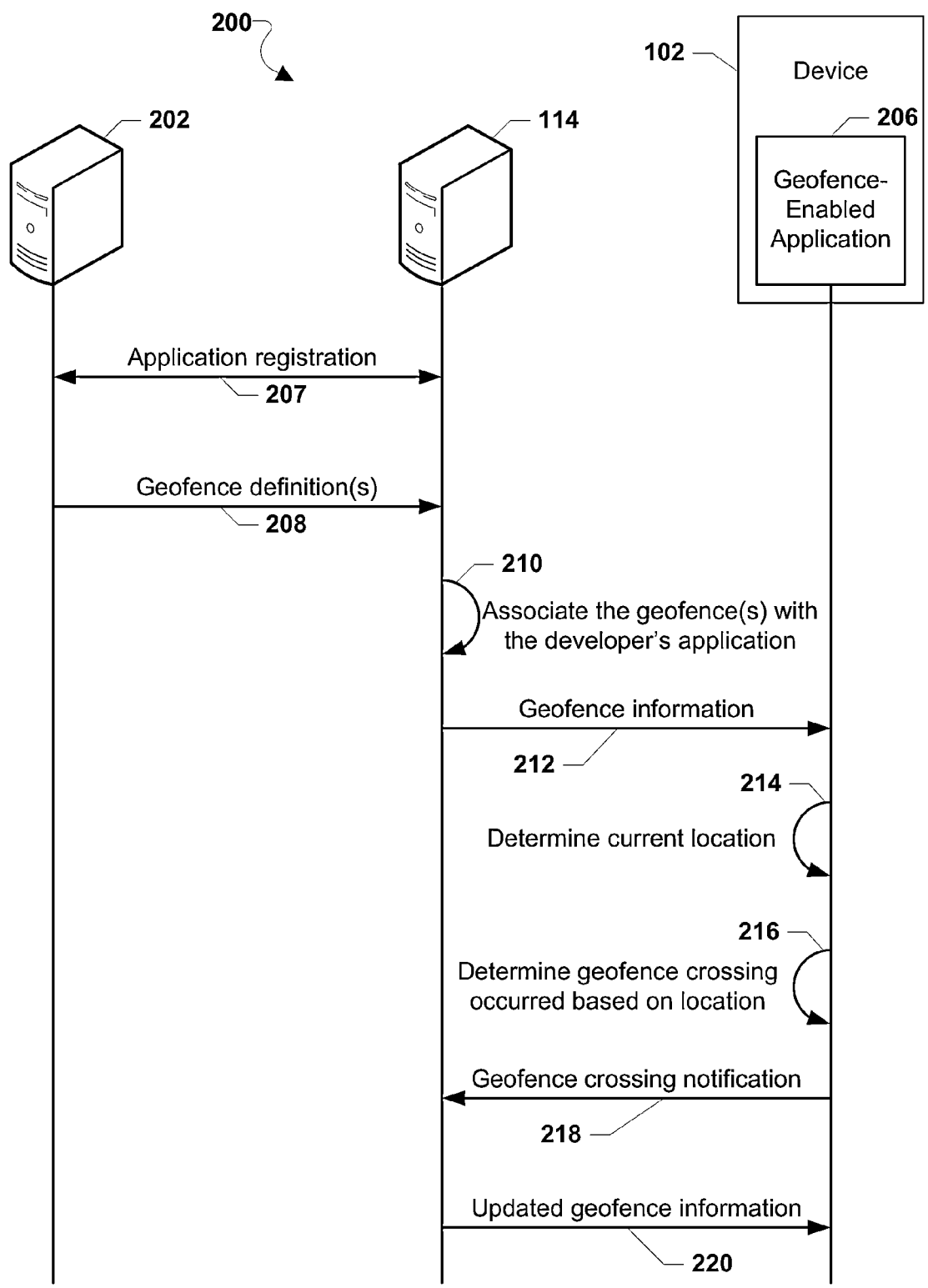
FIG. 2 is a typical signaling and call flow between an application developer, a geofence server, and a geofence-enabled application operating on a computing device.

FIG. 2 illustrates a signaling and call flow 200 for implementing location-based services on a geofence-enabled application according to known techniques.

Currently, an application developer may register an application with a geofencing service (e.g., the Gimbal® platform by Qualcomm) operating on a geofence server 114. The application developer's computer 202 and a geofence server 114 may exchange various application registrations communications 207. For example, the application developer may provide the geofence server 114 with various details about its application; the geofence server may perform various validation, verification, and/or quality assurance tests to test whether the application is compatible with the geofencing service; and after receiving approval, the application developer may include code or instructions received from the geofencing service (e.g., a software development kit or SDK) to embed into the application to enable the developer's application to communicate with the geofence server 114 (i.e., to enable geofencing capabilities).

After the registration process, the application developer's computer 202 may access the geofence service through an administrative portal or application programming interfaces (APIs) to define one or more geofences for the application 206. For example, the application developer's computer 202 may send information describing the perimeter, shape, size, etc. of a geofence (e.g., one or more geofence definitions 208) to the geofence server 114. The geofence server 114 may associate the one or more geofence definitions 208 with the developer's application 206 in operation 210.

At some point, a user of a computing device 102 may download the geofence-enabled application 206 that the application developer's computer 202 created onto the computing device 102. The user may also run the geofence-enabled application 206 to enable the geofence-enabled application 206 to communication with the geofence server 114. For example, the geofence-enabled application 206 may communicate with the geofence server 114 and receive geofence information 212 that includes the one or more geofence definitions 208.

After receiving the geofence information 212, the application 206 determines the current location (e.g., latitude and longitude) of the computing device 102 in operations 214. As described above with reference to FIG. 1, the application 206 may utilize various location-based systems or capabilities available on the computing device 102, such as GPS or Wi-Fi-based location services. The application 206 then determines whether a geofence crossing has occurred based on the current location of the computing device 102 in operation 216. The geofence-enabled application 206 continues to monitor the computing device's current location until it determines that the computing device has satisfied a geofence.

After the application 206 recognizes that the computing device has crossed a geofence (e.g., the geofence defined in the one or more geofence definitions 208), the geofence-enabled application 206 may send a geofence crossing notification 218 to the geofence server 114. The geofence crossing notification 218 may alert the geofence server that an action related to the geofence crossing must occur (e.g., pushing a notification to the computing device's user). Also, the geofence server 114 may sends updated geofence information 220 to the geofence-enabled application 206 that may include information regarding recently added geofences or other geofences that are in the computing device 102's current location based on the one or more geofence definitions 208 from the application developer's computer 202.

Figure 3A:
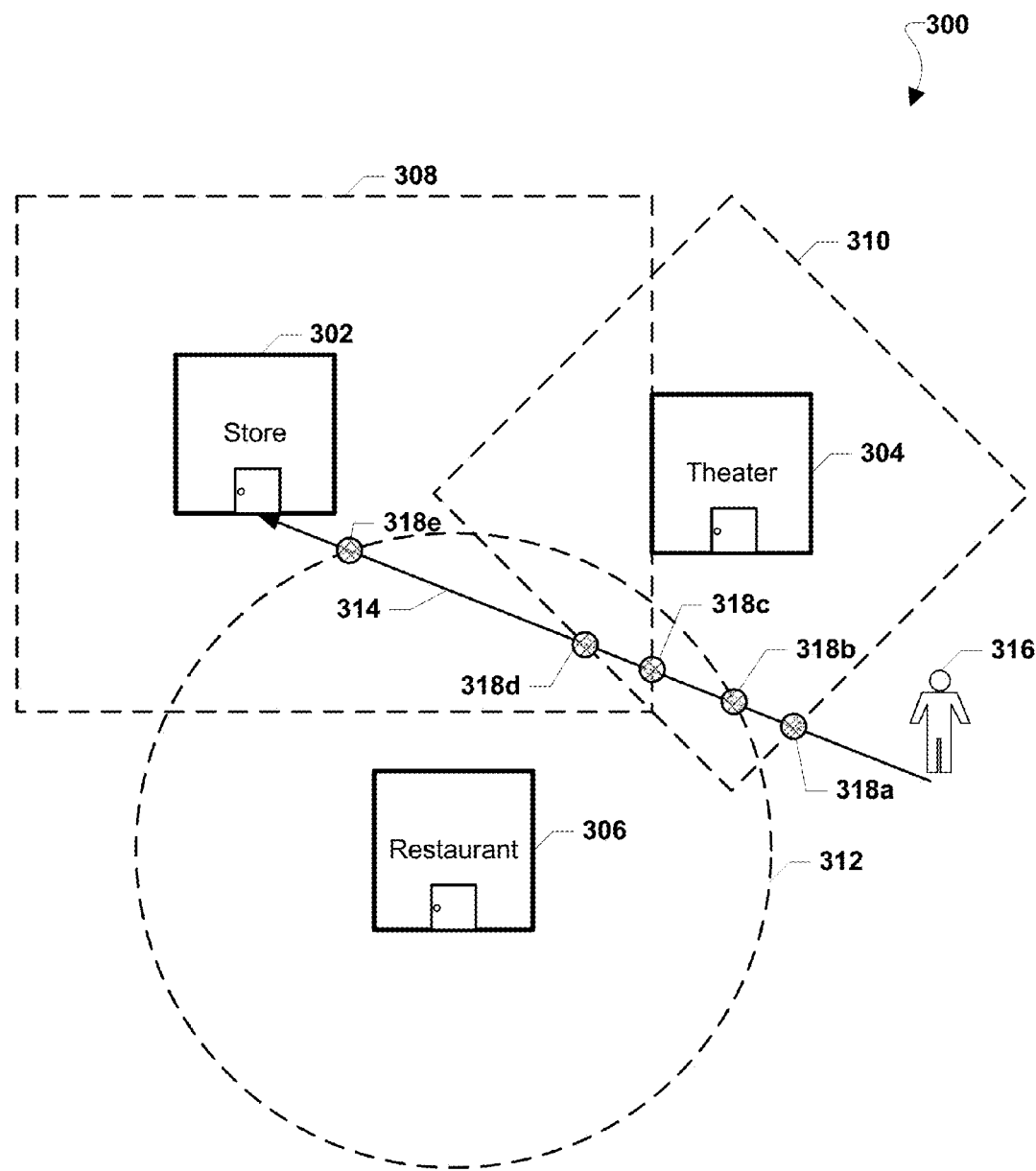
FIG. 3A is an illustration of overlapping geofences associated with different geofence-enabled applications at a location.
Figure 3B:
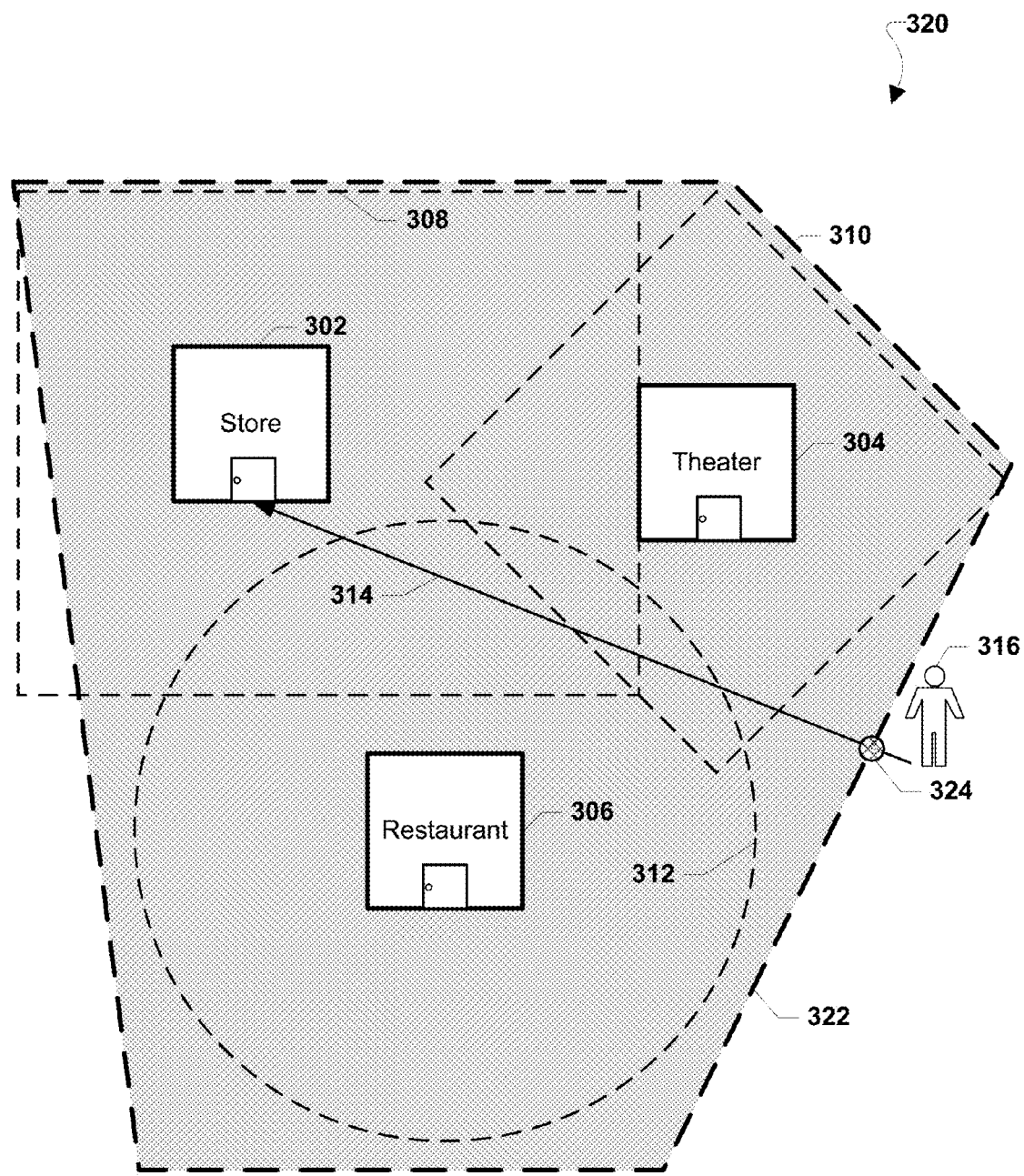
FIG. 3B is an illustration of a blended geofence generated from multiple overlapping geofences at a location according to an embodiment.

FIGS. 3A and 3B illustrate overhead diagrams 300, 320 of example representations of geofence areas that overlap or are in close proximity to one another.

FIG. 3A illustrates an overhead diagram 300 of individual geofences associated with difference geofence-enabled applications on the same computing device.

As discussed above, a computing device 102 may include various geofence-enabled applications. A geofence-enabled application may be developed by and/or associated with various organizations, businesses, events, etc. For example, the owners of a particular store may have developed a geofence-enabled application to inform consumers of the store's current inventory and of daily sales at the store.

In an example, a computing device 102 may include three geofence-enabled applications. A first geofence-enabled application may be an application for a particular retail store, and the first geofence-enabled application may be monitoring a first geofence 308 that surrounds the physical location of that retail store (i.e., the store 302). As described above with reference to FIG. 2, the store's owner may have previously defined the geofence 308 with a geofencing service, and a geofencing server associated with that geofencing service may have sent the geofence information to the first geofence-enabled application to enable the first geofence-enabled application to begin monitoring the geofence 308 (i.e., to begin implementing location-based services for the store 302).

Similarly, a second geofence-enabled application may be monitoring a second geofence 310 surrounding a theater 304, and a third geofence-enabled application may be monitoring a third geofence 312 surrounding a restaurant 306. In another embodiment, geofences 308, 310, 312 may be associated with a single geofence-enabled application, such as an application created by a developer for a mall.

As illustrated in FIG. 3A, developers may define the boundaries of geofences 308, 310, 312 to create various different shapes and sizes. For example, geofence 308 is a rectangle, geofence 310 is a diamond, and geofence 312 is a circle. While not shown, it is anticipated that a geofence may conform to almost any two-dimensional or three-dimensional shape.

In practice, geofence areas may have a minimum effective radius due to limitations of the implementation. For example, a computing device using GPS may have a minimum effective range of only 50 meters. As a result, geofences may frequently overlap with other, nearby geofence areas, especially in dense locations, such as malls and downtown areas. Thus, as illustrated in FIG. 3A, there may be areas in which two or more of geofences 308, 310, 312 overlap or are otherwise in close proximity.

Geofences may be specific to applications, not computing devices, so when multiple applications on a computing device are implementing geofencing, each geofence-enabled application on the computing device independently determines whether it has crossed one of its geofences and contacts the geofence server for updated geofence parameter information after crossing a geofence. For example, a computing device may include multiple geofence-enabled applications that are independently monitoring several geofences in a mall area. Because some or all of the geofences monitored by of the geofence-enabled applications may overlap or may be in close proximity, the geofence-enabled applications may independently use location-sensing radios (e.g. GPS, Wi-Fi, Bluetooth, Cellular, etc) to determine if a geofence has been crossed and contact the geofence server within a short time whenever their respective geofence is crossed, thus potentially expending a considerable amount of battery power and/or processing resources on the computing device. In other words, when a computing device includes applications that independently track overlapping or close geofence areas, the computing device may have to repeatedly use location-sensing radios to obtain an updated position fix, which consumes battery power, and in some applications also communicate with and receive updated geofence parameter information from the geofence server when approaching a location of several nearby geofences (i.e., at least once for each application with a satisfied geofence), which also consumes battery power. This situation may also occur when a single geofence-enabled application has multiple overlapping or nearly overlapping geofences in the same area, such as an application for a mall that includes geofences for each store.

As illustrated in FIG. 3A, as a user 316 walks along a path 314 to the store 302, the user's computing device (not shown) may have to use location-sensing radios to detect crossing geofence 308, 310, 312 and communicate with the geofence server whenever a geofence 308, 310, 312 is crossed for any of the first, second, and third geofence-enabled applications. Further, because geofences 308, 310, 312 overlap, the computing device may have to use location-sensing radios with a high frequency as the user 316 walks along the path 314 to detect crossing geofences 308, 310, 312, and the computing device may also have to communicate with the geofence server several times in a short amount of time, thereby causing excessive demand on the computing device's radio transceivers, processor, and battery. For example, as the user 316 walks to the store 302, the computing device may have to detect five geofence crossings and communicate with the geofence server five times in rapid succession (i.e., once for each time the computing device passes through one of geofence crossing sites 318a-318e).

FIG. 3B illustrates a diagram 320 of a single, blended geofence 322 generated by combining multiple overlapping or nearby geofences 308, 310, and 312 associated with one or more geofence-enabled applications on the same computing device.

In an embodiment, the geofence server may recognize when one or more geofence-enabled applications on the same computing device have overlapping or nearby geofences and may blend these geofences to create a single, blended geofence. By blending separate, overlapping or close-by geofences, the geofence server may reduce and/or improve synchronization among geofence-enabled applications operating on the same computing device, thereby enabling the computing device to spend less time and/or power detecting a geofence crossing and/or communicating with the geofence server on behalf of the geofence-enabled applications.

In further embodiments, a geofence management unit application operating on the computing device may blend the geofences of geofence-enabled application operating on the same computing device.

As illustrated in FIG. 3B, the geofence server may recognize that the first, second, and third geofence-enabled applications are operating on the computing device and may combine geofences 308, 310, 312 into a single blended geofence 322. In an embodiment, the geofence server may use various techniques to combine multiple geofences into a single blended geofence as further described below with reference to FIGS. 15A-15C.

After combining geofences 308, 310, 312, the geofence server (or geofence management unit) may send the blended geofence 322 to the first, second, and third geofence-enabled application as updated geofence information. Thus, in an embodiment, the geofence server may replace the first, second, and third geofence-enabled applications separate geofences 308, 310, 312 with the blended geofence 322, meaning that each application may begin monitoring the blended geofence 322.

Because the first, second, and third geofence-enabled applications may monitor the same blended geofence 322, the first, second, and third geofence-enabled applications may simultaneously or nearly simultaneously recognize when the blended geofence 322 is crossed, and the computing device may report geofence crossings to the geofence server on behalf of the first, second, and third geofence-enabled applications at the same or nearly the same time, thereby reducing the amount of time and/or power the computing device may spend detecting a geofence crossing using location-sensing radios and communicating with the geofence server.

For example, as illustrated in FIG. 3B, as the user 316 walks to the store 302 along the path 314, the user 316's computing device may cross the blended geofence 322 at one geofence crossing site 324, at which time the geofence boundary may be satisfied for each geofence-enabled application operating on the computing device. Thus, rather than detecting five separate geofence crossing sites 318a-318e as illustrated above in FIG. 3A and communicating with the geofence server five times at each of geofence crossing sites 318a-318e, the computing device may instead only need to detect one crossing site and communicate with the geofence server once for each of the geofence-enabled applications (e.g., in the same transmission) because the geofence-enabled applications are monitoring the same blended geofence 322 and thus recognize when the blended geofence 322 is crossed at the same or nearly the same time.

Figure 4A:
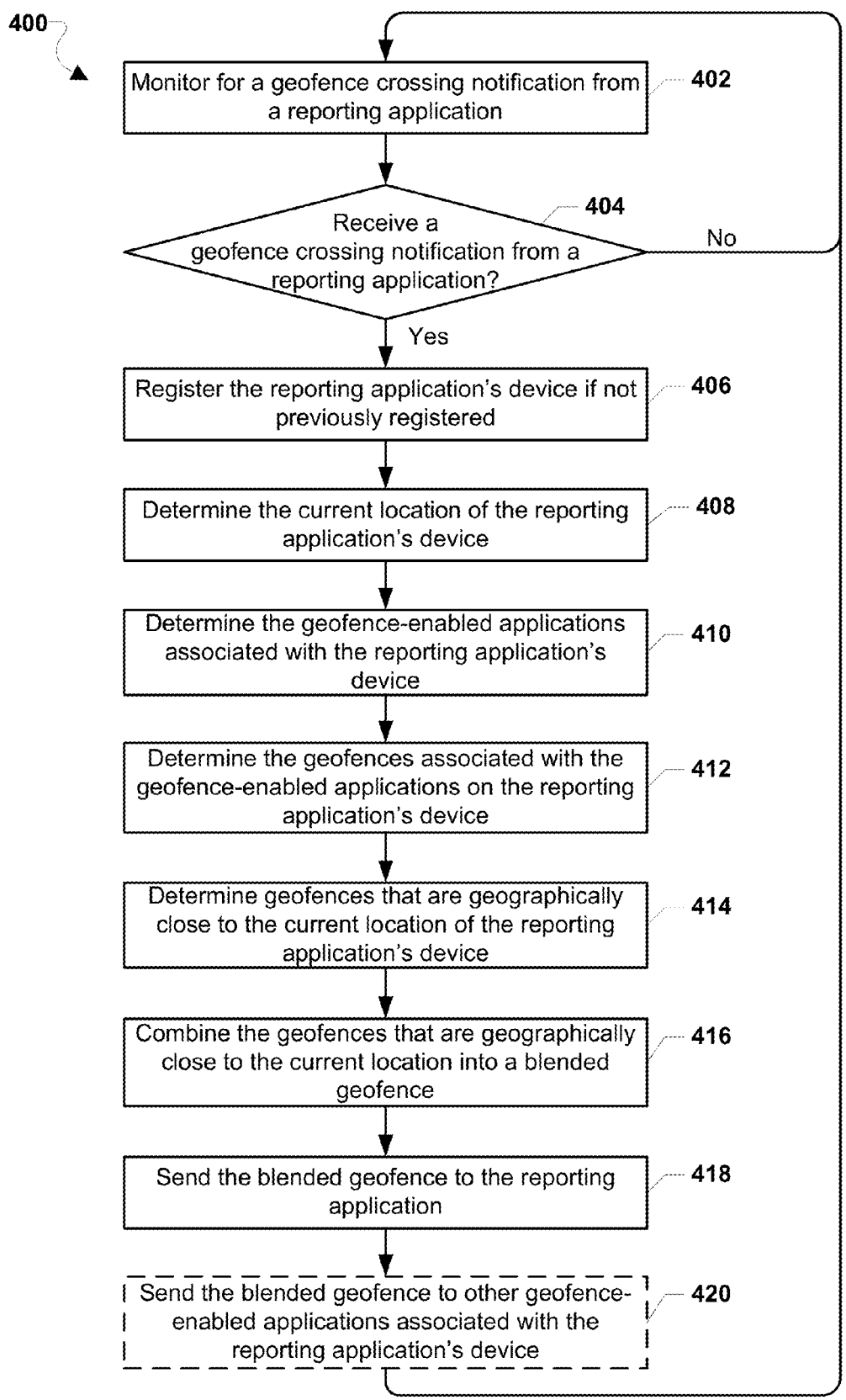
FIG. 4A is a process flow diagram illustrating an embodiment method for generating a blended geofence on a geofence server for a reporting application operating on a computing device based on the current location of the computing device.
Figure 4B:
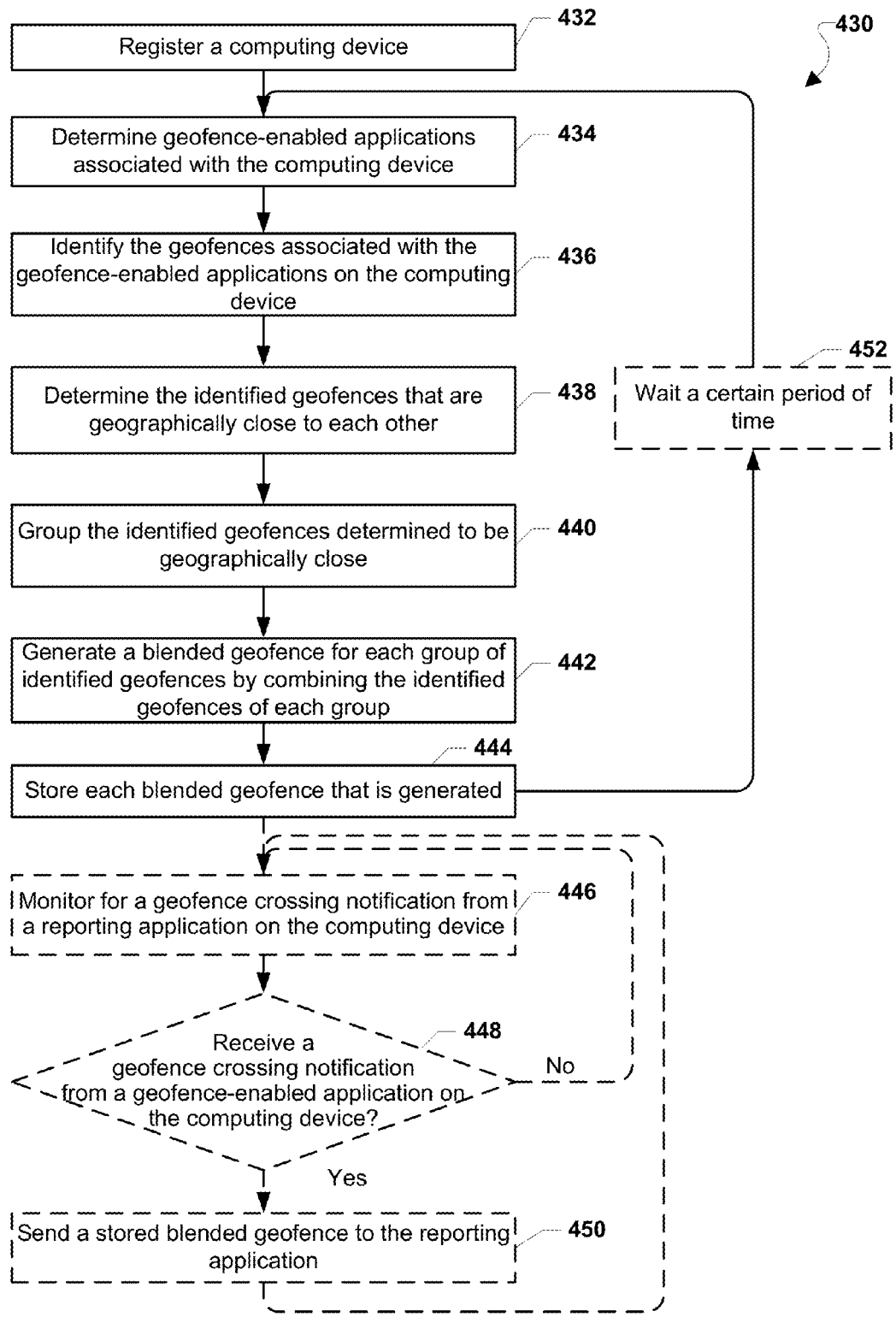
FIG. 4B is a process flow diagram illustrating an embodiment method for generating a blended geofence on a geofence server for a computing device.

FIGS. 4A and 4B illustrate embodiment methods 400, 430 that may be performed by a processor executing on a server for generating blended geofences for use by geofence-enabled applications operating on a computing device or by a geofence management unit operating on the computing device that monitors the blended geofence on behalf of the applications whose geofences are encompassed in a blended geofence.

The operations of method 400 implement an embodiment in which the server may blend geofences determined to be geographically close to the current location of the computing device. By focusing on geofences geographically close to the computing device's current location, the server may leverage the tendency of most computing device users to stay within a relatively small geographical region to generate a reasonable number of useful blended geofences. For example, rather than combining geofences situated across the entire country, the server may only combine geofences close to the user's home or place of work.

In further embodiments such as those described below with reference to FIG. 4B, the geofence server may combine geofences into blended geofences more generally, irrespective of the mobile device's current location. Specifically, the geofence server may be configured to generate blended geofences from groups of geofences that are determined to be geographically close to each other without regard for the current location of the computing device. Thus, in such embodiments, the geofence server may generate a full complement of blended geofences for various geographical areas (e.g., a state or an entire region of a country) in advance and may send one or more of these blended geofences to the computing device as needed, such as in response to a receiving geofence crossing notifications or preemptively in the form of "pushed" data.

For ease of description, various embodiments, such as those described below with reference to FIGS. 4A-7B, may include operations that include or depend on the current location of the computing device. However, any reference to or dependency on the current location of the computing device is not intended to limit the scope of the claims unless explicitly recited in the claims.

FIG. 4A illustrates an embodiment method 400 that may be implemented on a geofence server for combining multiple geofences associated with different geofence-enabled application operating on the same computing device into a single blended geofence. In an embodiment, the geofence server may send the blended geofence to geofence-enabled applications operating on the same computing device so that the geofence-enabled applications monitor the same geofence and, thus, detect when the blended geofence is satisfied at the same or nearly the same time.

In block 402, the geofence server may monitor for a geofence crossing notification from a reporting application. In an embodiment, the reporting application may be a geofence-enabled application operating on a computing device, and the reporting application may have detected that a geofence has been crossed based on its computing device's current location determined via location-sensing radios. In response to detecting that the geofence has been crossed, the reporting application may send a geofence crossing notification (e.g., a message) to the geofence server as described above with reference to FIG. 2.

In another embodiment, the geofence crossing notification may include information the geofence server may require in order to provide location-based services to the reporting application. For instance, the geofence crossing notification may include the reporting application's identity, the identity of the reporting application's computing device, the current location of the computing device, the identity of the user (e.g., the user's phone number and email address), etc.

In determination block 404, the geofence server may determine whether it has received a geofence crossing notification from a reporting application. When the geofence server determines that it has not received a geofence crossing notification from a reporting application (i.e., determination block 404="No"), the geofence server may continuously repeat the process in determination block 404 to recognize when it has received a geofence crossing notification from a reporting application. In an embodiment, the geofence server may remain in an idle or low-power state until it receives a geofence crossing notification.

When the geofence server determines that it has received a geofence crossing notification from a reporting application (i.e., determination block 404="Yes"), the geofence server may register the reporting application's computing device when the reporting application's computing device has not previously been registered with the geofence server in block 406. In an embodiment, the geofence server may register the reporting application's computing device by recording the computing device's identification information included in the geofence crossing notification and associating the computing device with the reporting application. Registering a computing device is further described below with reference to FIG. 5.

In block 408, the geofence server may determine the current location of the reporting application's computing device. As described above, the geofence server may receive the reporting application's computing device's current location as part of the geofence crossing notification received from the reporting application. In another embodiment, the geofence server may send a signal to the reporting application requesting the current location of its computing device.

In block 410, the geofence server may determine the geofence-enabled applications associated with the reporting application's computing device. In an embodiment, the geofence server may maintain an association between geofence-enabled applications and their computing devices, such as registering the geofence-enabled applications' computing devices as described above with reference to block 406, and the geofence server may use these associations to determine the other geofence-enabled applications that are included on (i.e., associated with) the reporting application's computing device. For example, the geofence server may perform a database lookup using the reporting application's computing device's identification criteria to determine the geofence-enabled applications (including the reporting application) that are associated with the computing device.

In block 412, the geofence server may determine the geofences associated with the geofence-enabled applications on the reporting application's computing device. For example, as illustrated above with reference to FIG. 3A, in addition to the reporting application (e.g., the first geofence-enabled application), the geofence server may determine that there are two other geofence-enabled applications operating on the computing device (e.g., the second and third geofence-enabled applications) and that each geofence-enabled application has one or more geofences. In another embodiment, the geofences may be associated with a single geofence-enabled application.

In block 414, the geofence server may determine geofences that are geographically close to the current location of the reporting application's computing device. In embodiment, the geofence server may perform various calculations to determine whether the geofences for the geofence-enabled applications on the reporting application's computing device are overlapping and/or in close proximity (i.e., geographically close). For example, the geofence server may determine the area and/or perimeter of each of the geofences in the computing device's current area and may determine whether a plurality of the geofences have areas and/or perimeters that overlap or that are almost overlapping. In a further embodiment, geofences may be geographically close without overlapping, such as when two geofences are within a certain distance of each other.

In block 416, the geofence server may combine geofences that are geographically close at the current location into a blended geofence. The geofence server may implement various techniques to combine the geofences. For example, the geofence server may generate a blended geofence that encompasses each of the separate geofences that are geographically close, or the geofence server may create a blended geofence that represents a centered-shape of the geofences using a weighted average of the geofences' shapes. Combining the geofences into a blended geofence is further described below with reference to FIGS. 15A-15C.

In block 418, the geofence server may send the blended geofence to computing device, such as to the reporting application. Thus, in an embodiment, after receiving the blended geofence, the reporting application may begin monitoring for geofence crossings using the blended geofence instead of geofences defined by the reporting application's developer.

In another embodiment, the geofence server may send the blended geofence to other geofence-enabled applications associated with the reporting application's computing device in optional block 420. For example, the geofence server may "push" the blended geofence to each geofence-enabled application on the same computing device such that those geofence-enabled applications begin monitoring the same geofence immediately.

The geofence server may execute the embodiment process in a continuous loop returning to block 402 so that the geofence server continuously monitors whether it has received a geofence crossing notification from another reporting application. In an embodiment, the geofence server may ultimately receive geofence crossing notifications from each geofence-enabled application on the same computing device and may perform the embodiment process to send each of those geofence-enable applications a common blended geofence to monitor. Thus, each of the geofence-enable applications with a geofence in the computing device's current area may share the same blended geofence, and the computing device may coordinate/synchronize communications with the geofence server on behalf of the geofence-enabled applications when the computing device crosses the blended geofence as a consequence of the geofence-enabled applications' monitoring the same geofence.

In a further embodiment, the geofence server may perform the operations described above to combine multiple geographically close geofences for a single geofence-enabled application into a blended geofence, thereby enabling the single geofence-enabled application to monitor a single, blended geofence rather than multiple individual geofences.

As mentioned above, FIG. 4B illustrates an embodiment method 430 that may be implemented by a geofence server for generating blended geofences for use by geofence-enabled applications operating on a computing device without regard to the device's current location.

In an embodiment, a geofence server may have access to all of the possible geofences for all the possible geofence-enabled applications executing on a computing device. In such an embodiment, the geofence server may periodically (e.g., nightly or weekly) create and store all possible blended geofences available for the geofence-enabled applications on the computing device. Thus, in a further embodiment, in response to receiving a geofence crossing notification or another request for geofence information from an application on the computing device, the geofence server may quickly access a stored blended geofence and send it to the requesting application. In other words, the geofence server may prepare pre-generated blended geofences for applications and may send those pre-made blended geofences to the applications as requested or needed.

In block 432, the geofence server may register a computing device as described above in block 406 of method 400 described with reference to FIG. 4A. The geofence server may also determine the geofence-enabled applications associated with the computing device in block 434, such as by identifying one or more geofence-enabled applications that are associated with the computing device as part of the registration process in block 432.

In block 436, the geofence server may identify the geofences associated with the geofence-enabled application on the computing device as generally described with reference to the operations of block 412 of method 400 described with reference to FIG. 4A. For example, the geofence server may perform lookup operations in a geofence database 116 to discover one or more geofences associated with each geofence-enabled application operating on the mobile device. In a further embodiment, the geofence server may only identify geofences that are within a certain distance of the computing device. For example, the geofence server may only identify geofences within one-hundred miles of the computing device to conserve processing resources. In another embodiment, the geofence server may identify every geofence associated with the geofence-enabled applications associated with the computing device in block 434 regardless of the computing device's current location.

The geofence server may also determine the identified geofences that are geographically close to each other in block

438. In an embodiment, geofences may be geographically close to each other when their respective areas are within a certain distance from each other or when their areas overlap in excess of a predefined threshold (e.g., over 10% overlap). For example, the geofence server may determine that geofences 308, 310, 312 described above with reference to FIG. 3A are geographically close to each other because their areas overlap. In block 440, the server may also group the identified geofences determined to be geographically close in block 438.

In block 442, the geofence server may generate a blended geofence for each group of identified geofences by combining the identified geofences of each group, such as by performing operations similar to the operations of block 416 of method 400 described above with reference to FIG. 4A. In an embodiment, by performing the operations of block 442, the geofence server may generate every possible blended geofence—or, alternatively, a particular subset of all possible blended geofences (e.g., blended geofences for a certain area)—available for the geofence-enabled applications. In block 444, the geofence server may also store each blended geofence generated in block 442 for later use. The geofence server may optionally wait a certain period of time (e.g., twenty-four hours, one week, or months, etc.) in block 452. The geofence server may also repeat the operations described above starting in block 434. Thus, in an embodiment, the geofence server may repeat the above operations, for example, as part of a regular job or routine in order to keep the set of stored geofences current.

In further embodiments, the geofence server may perform other operations that may occur simultaneously with or after the operations described above. In optional block 446, the geofence server may optionally monitor for a geofence crossing notification from a reporting application operating on the computing device as described above in block 402 of method 400 described with reference to FIG. 4A.

In optional determination block 448, the geofence server may determine whether it has received a geofence crossing notification from the computing device, such as from a reporting application as described above. When the geofence server determines that it has not received a geofence crossing notification (i.e., optional determination block 448="No"), the server may continuously repeat the process starting in optional block 446 to recognize when it has received a geofence crossing notification from a reporting application. In an embodiment, the geofence server may remain in an idle or low-power state until it receives a geofence crossing notification.

When the geofence server determines that it has received a geofence crossing notification (i.e., optional determination block 448="Yes"), the server may send a stored blended geofence to the reporting application in optional block 450. In an embodiment, the stored blended geofence sent to the reporting application may be associated with the reporting application (i.e., geofences associated with the reporting application may have been used to generate the blended geofence as described above in block 442). The geofence server may also repeat the above operations starting in optional block 446.

In another embodiment of the operations of optional block 450, the geofence server may preemptively send the one or more blended geofences to the computing device without receiving a geofence crossing notification. For example, the geofence server may push blended geofences to the computing device, thereby enabling the geofence-enabled applications on the computing device to begin monitoring those blended geofences almost immediately. Thus, in such an embodiment, when the computing device moves to an area covered by a blended geofence, a geofence-enabled application monitoring that area may quickly access the blended geofence information without having to request updated geofence information from the geofence server.

Figure 5:
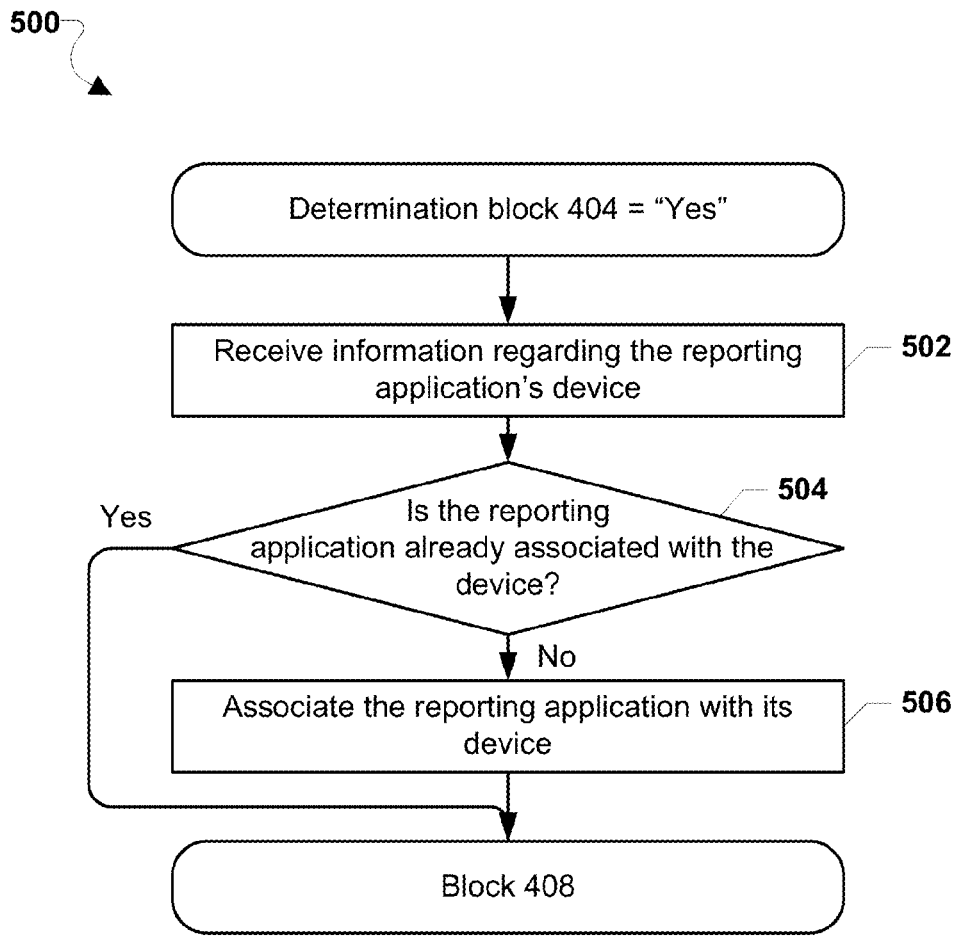
FIG. 5 is a process flow diagram illustrating an embodiment method for registering a computing device associated with a reporting application with a geofence server.

FIG. 5 illustrates an embodiment method 500 that may be implemented by a geofence server for registering a computing device to be associated with a reporting application. The operations of method 500 implement an embodiment of the operations of block 406 of method 400 described above with reference to FIG. 4A. Thus, in an embodiment, the geofence server may begin performing method 500 after determining that it has received a geofence crossing notification from a reporting application (i.e., determination block 404="Yes").

In block 502, the geofence server may receive information regarding the reporting application's computing device. In an embodiment, the geofence server may receive information about the reporting application's computing device as part of the reporting computing device's geofence crossing notification, or the geofence server may separately request the reporting application to provide identification information for the computing device after receiving the geofence crossing notification.

In determination block 504, the geofence server may determine whether the reporting application is already associated with the computing device. In other words, the geofence server may determine whether the reporting application has ever reported a geofence crossing notification on this particular computing device before. In an embodiment, as there may be multiple copies of the reporting application on other computing devices, the geofence server may associate the reporting application with the particular computing device on which it is operating to ensure that the geofence server may keep track of the geofence-enabled applications that operate on the same computing device. In an embodiment, the geofence server may determine that there is not already an association between the reporting application and the computing device when the reporting application has never communicated with the geofence server on that computing device before (e.g., as a result of just being installed and run for the first time on the computing device).

When the geofence server determines that the reporting application is already associated with the computing device (i.e., determination block 504="Yes"), the geofence server may continue performing the process in block 408 of method 400 described above with reference to FIG. 4A by determining the current location of the reporting application's computing device.

When the geofence server determines that the reporting application's computing device is not already registered (i.e., determination block 504="No"), the geofence server may associate the reporting application with its computing device in block 506. In an embodiment, the geofence server accomplish this operation by recording an association between the reporting application and the computing device in a geofence information database 116 as described above with reference to FIG. 1.

The geofence server may continue performing the process in block 408 of method 400 described above with reference to FIG. 4A by determining the current location of the reporting application's computing device.

Figure 6:
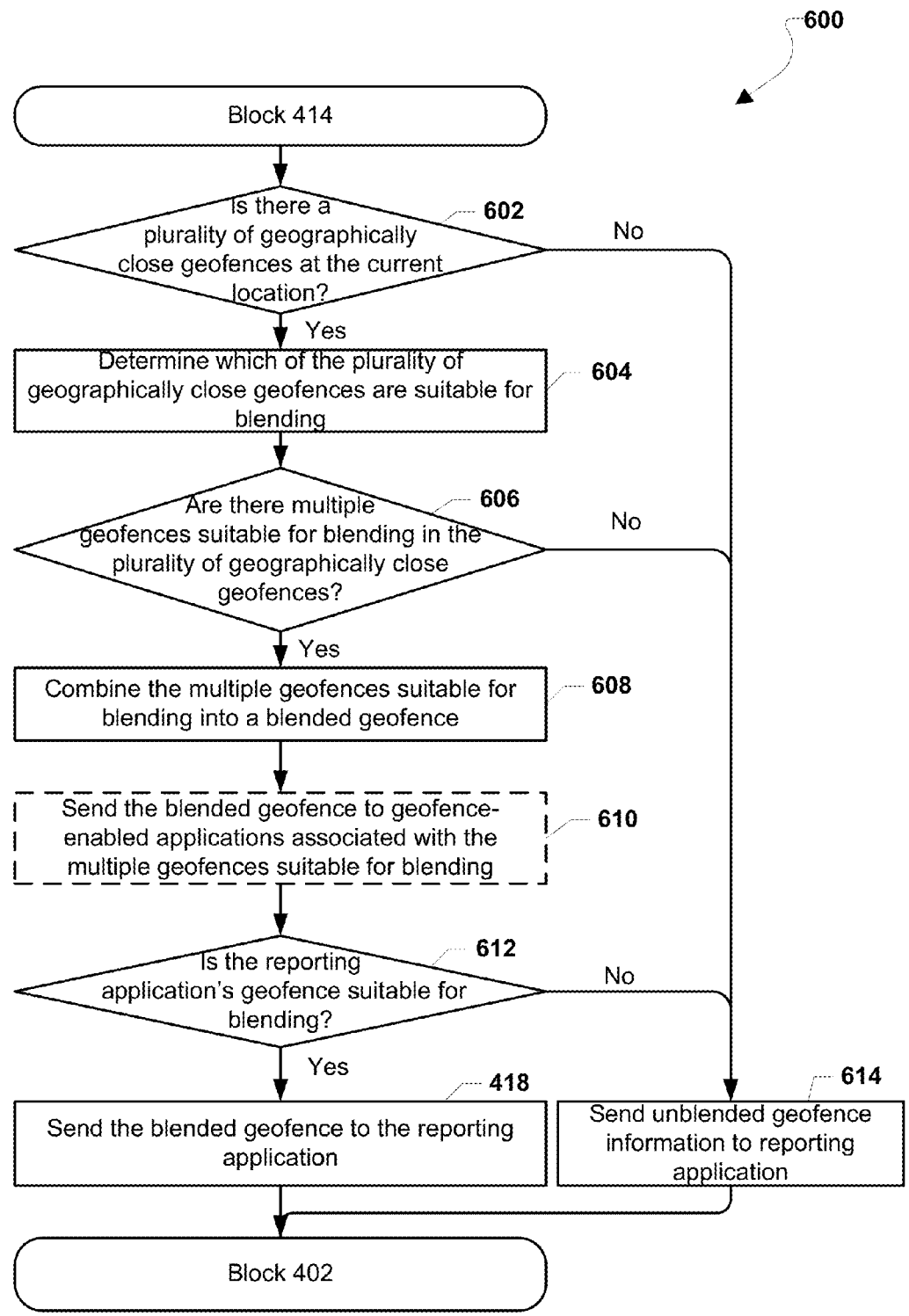
FIG. 6 is a process flow diagram illustrating an embodiment method for determining whether to send a blended geofence or unblended geofence information to a reporting application.

FIG. 6 illustrates an embodiment method 600 that may be implemented on a geofence server for sending a blended geofence to a reporting application in response to determining that there are multiple geofences at the current location that are suitable for or compatible with blending (i.e., the geofence can be blended without substantially degrading functionality or operation of the application or geofence). The operations of method 600 implement an embodiment of the operations of method 400 described above with reference to FIG. 4A. Thus, the geofence server may begin performing method 600 after determining the geofences present at the computing device's current location that are geographically close in block 414 of method 400 described above with reference to FIG. 4A.

In determination block 602, the geofence server may determine whether there is a plurality of geographically close geofences at the current location. In an embodiment, the geofence server may require at least two geofences that are overlapping or almost overlapping (i.e., geographically close) to be in the current location in order to generate a blended geofence. For example, while a computing device may include four geofence-enabled applications, only one of those geofence-enabled applications may have a geofence in the computing device's current area. In this example, the geofence server may be unable to generate a blended geofence because there is only one geofence in the current location.

When the geofence server determines that there is not a plurality of geographically close geofences at the current location (i.e., determination block 602="No"), the geofence server may send unblended geofence information to the reporting application in block 614. In an embodiment, the geofence server may send unblended geofence information to the reporting application as described above with reference to FIG. 2. Thus, in an example, the reporting application may receive geofences as originally defined by the reporting application's developers. The geofence server may execute the embodiment process in a continuous loop returning to block 402 of method 400 described above with reference to FIG. 4A so that the geofence server continuously monitors whether it has received a geofence crossing notification from another reporting application.

When the geofence server determines that there is a plurality of geographically close geofences at the current location (i.e., determination block 602="Yes"), the geofence server may determine which of the plurality of geographically close geofences are suitable for blending in block 604. In an embodiment, the geofence server may inspect each of the geographically close geofences to determine whether the geographically close geofences are able to be blended together. The geofence server may look at individual geofence characteristics (e.g., whether the reporting application's developer has requested that a particular geofence never be blended or be blended only under certain conditions), the plurality of geographically close geofences as a whole, and various other information surrounding the geofences, the geofence-enabled applications associated with those geofences, and those geofence-enabled applications' developers.

In an embodiment, the geofence server may determine whether the geographically close geofences are suitable for blending based on the shapes of the geofences. For example, the geofence server may perform a shape analysis of the geographically close geofences to assess whether two or more of the geofences' shapes are "compatible" for blending. In an embodiment, geofence shapes may be suitable for blending when the geofence server is able to combine the geofence shapes without a substantial impact on performance, functionality or responsiveness of the associated geofence applications. In other words, the geofence server may determine whether blending two or more geofences would result in a blended geofence that substantially degrades the location-based services of the underlying geofence-enabled applications. For example, the geofence server may determine that a circular geofence and a square geofence that barely overlap may be incompatible because combining those geofence may generate a single blended geofence that would be significantly larger than either the circular or square geofences or would be shaped in such a way as to omit some areas covered by the original geofences. In another embodiment, the geofence server may determine that shapes are unsuitable for blending when the resulting blended geofence exceeds a size threshold based on the sizes of the original geofences (e.g., the blended geofence may not be larger than 150% of the original geofences' combined area) and/or does not exceed an area-covered threshold based on the areas covered by the original geofences (e.g., the blended geofence may be required to cover at least 85% of the original geofences' areas).

In an embodiment, the geofence server may reference geofence metadata to determine whether the geofences are suitable for blending. The geofence server may determine each of the geofences' type (e.g., a walking geofence, a driving geofence, a business geofence, a commerce geofence, etc.) and may only combine geofences that have compatible types. In other words, the geofence server may only blend geofences when the target/purpose of the location-based services will not be substantially degraded by combining them. For example, a geofence designed to alert pedestrians of daily deals at a store in a mall may be incompatible with a geofence designed to alert drivers passing by the mall of a garage's oil-change specials.

In another embodiment, the geofence server may determine whether the geographically close geofences are suitable for blending based on developer-set characteristics/parameters. During the process of defining a geofence for an application, a developer may specify that the geofence may not be blended with another geofence. For example, the developer may require maximum precision to achieve the developer's goal for the geofence, such as for a marathon application that has a geofence at the finish line. In such an example, the purpose of the geofence (e.g., to automatically indicate when a user has finished running the marathon) may be frustrated if the geofence's area/precision is changed as a result of blending. In an embodiment, the geofence server may check a developer flag or another value that indicates whether the developer allows blending of a particular geofence.

In determination block 606, the geofence server may determine whether there are multiple geofences suitable for blending in the plurality of geographically close geofences. For example, while there may be several geographically close geofences in the computing device's current area, none of them may be suitable for blending because of incompatible shapes, types, etc.

When the geofence server determines that there are no compatible geofences in the plurality of geographically close geofences (i.e., determination block 606="No"), the geofence server may send unblended geofence information to the reporting application in block 614. As described above, the geofence server may not send an updated geofence for geofences originally defined by the reporting application's developers when the geofence server does not combine geofences. The geofence server may execute the embodiment process in a continuous loop returning to block 402 so that the geofence server continuously monitors whether it has received a geofence crossing notification from another reporting application.

When the geofence server determines that there are compatible geofences in the plurality of geographically close geofences (i.e., determination block 606="Yes"), the geofence server may combine the multiple geofences suitable for blending into a blended geofence in block 608. In an embodiment, the geofence server may combine the multiple compatible geofences into a blended geofence in a manner similar to the process described above in block 416 of method 400 described above with reference to FIG. 4A. For example, the geofence server may take a weighted average of the multiple compatible geofences' shapes and generate a single geofence based on the weighted average.

In optional block 610, the geofence server may send the blended geofence to the geofence-enabled applications associated with the multiple compatible geofences. In an embodiment, the geofence server may preemptively push the blended geofence to geofence-enabled applications associated with the multiple geofences suitable for blending to enable those applications to immediately begin monitoring the blended geofence. Thus, the geofence server may avoid having to send the blended geofence to those geofence-enabled applications in response to receiving geofence crossing notifications from each of those applications.

In determination block 612, the geofence server may determine whether the reporting application's geofence is suitable for blending. In other words, the geofence server may determine whether the reporting application's geofence is included in the multiple geofences suitable for blending as described above with reference to determination block 606.

When the geofence server determines that the reporting application's geofence is not suitable for blending (i.e., determination block 612="No"), the geofence server may send unblended geofence information to the reporting application in block 614. In an embodiment, the geofence server may only send updated geofence information for the reporting application's geofences. The geofence server may execute the embodiment process in a continuous loop returning to block 402 of method 400 described above with reference to FIG. 4A so that the geofence server continuously monitors whether it has received a geofence crossing notification from another reporting application.

When the geofence server determines that the reporting application's geofence is suitable for blending (i.e., determination block 612="Yes"), the geofence server may send the blended geofence to the reporting application in block 418 as described above with reference to FIG. 4A. The geofence server may also execute the embodiment process in a continuous loop returning to block 402 of method 400 described above with reference to FIG. 4A so that the geofence server continuously monitors whether it has received a geofence crossing notification from another reporting application.

Figure 7A:
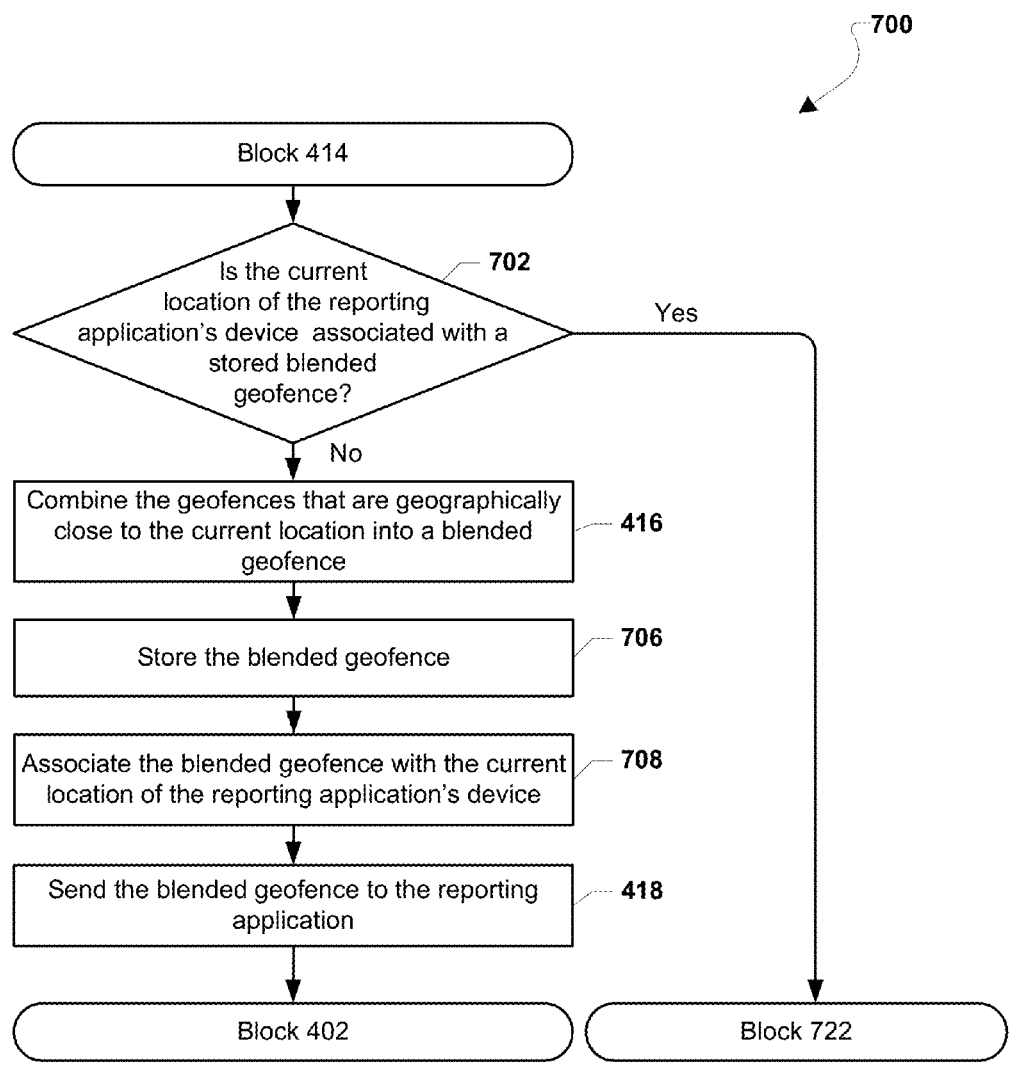
FIGS. 7A and 7B are process flow diagrams illustrating an embodiment method for generating and storing a blended geofence associated with a current location and sending a stored blended geofence associated with a current location to a reporting application.
Figure 7B:
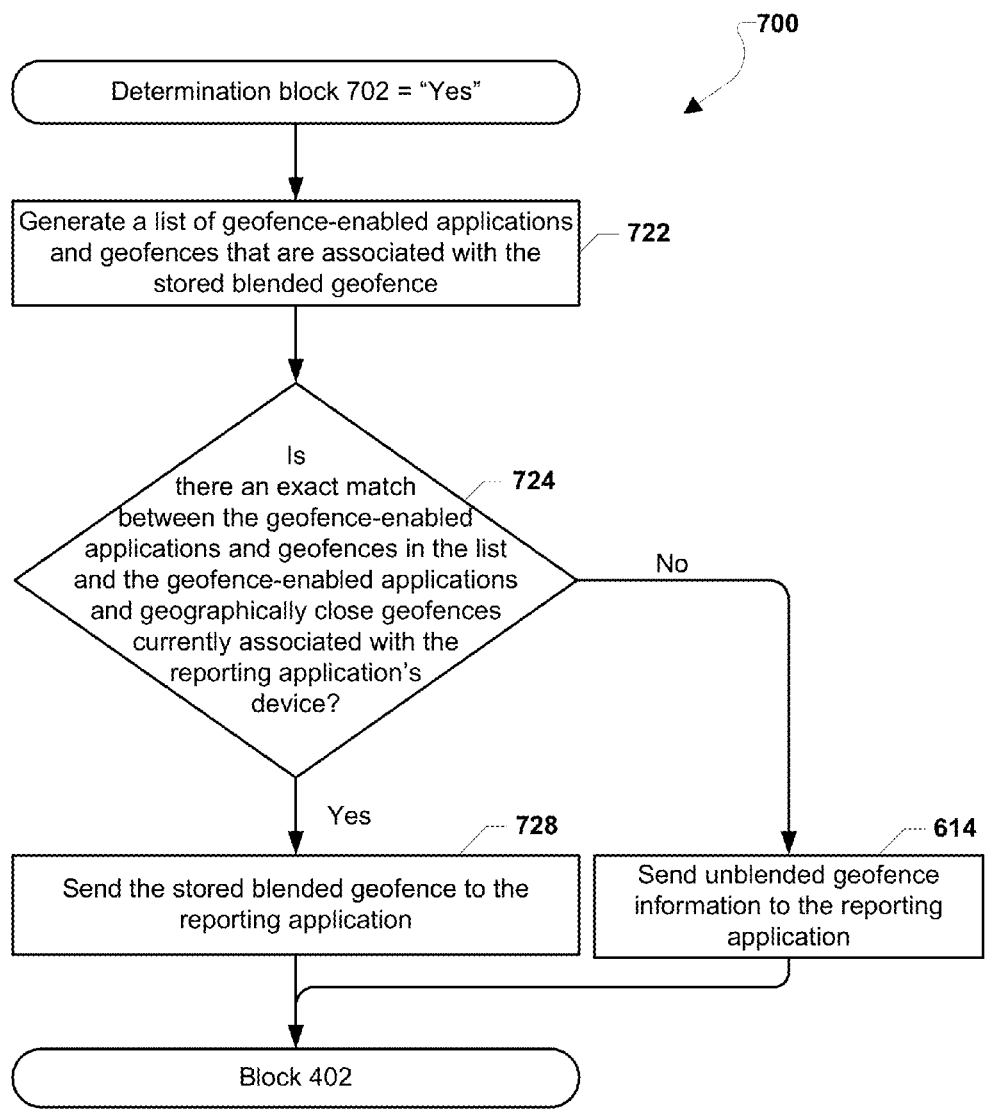

FIGS. 7A and 7B illustrate an embodiment method 700 that may be implemented on a geofence server for generating a blended geofence and storing the blended geofence for later use. The operations of method 700 implement an embodiment of the operations of method 400 described above with reference to FIG. 4A. Thus, the geofence server may begin performing method 700 after determining the geofences that are geographically close to the current location of the reporting application's computing device in block 414 of method 400 described above with reference to FIG. 4A.

Referring to FIG. 7A, in determination block 702, the geofence server may determine whether the current location of the reporting application's computing device is associated with a stored blended geofence. In an embodiment, the geofence server may associate previously generated blended geofences with a particular area for later use by other geofence-enabled applications. In other words, rather than generating the same blended geofence for a particular area for multiple geofence-enabled applications operating on various computing devices, the geofence server may retain previously generated blended geofences as further described below with reference to blocks 706 and 708, and the geofence server may send blended geofence to other geofence-enabled applications on the same computing device without having to generate the blended geofence from scratch each time.

When the geofence server determines that the current location of the reporting application's computing device is associated with a stored blended geofence (i.e., determination block 702="Yes"), the process may perform the operations in block 722 described below with reference to FIG. 7B.

When the geofence server determines that the current location of the reporting application's computing device is not associated with a stored blended geofence (i.e., determination block 702="No"), the geofence server may combine the geofences that are geographically close to the current location into a blended geofence in block 416 as described above with reference to FIG. 4A.

In block 706, the geofence server may store the blended geofence. In an embodiment, the geofence server may store the blended geofence, as well as identifiers of the applications and geofences associated with the blended geofence in a geofence information database, such as geofence information database 116. In block 708, the geofence server may associate the blended geofence with the current location of the reporting application's computing device. Thus, as described above with reference to determination block 702, the geofence server may be able to recall the stored blended geofence to send to other geofence-enabled applications in the future without having to re-blend the geofences in the current location. In an embodiment, each stored blended geofence may be associated with a particular combination of geofence-enabled applications and geofences on the reporting application's computing device as further described below with reference to FIG. 7B.

In block 418, the geofence server may send the blended geofence to the reporting application as described above with reference to FIG. 4A. The geofence server may execute the embodiment process in a continuous loop returning to perform the operations in block 402 of method 400 described above with reference to FIG. 4A so that the geofence server continuously monitors whether it has received a geofence crossing notification from another reporting application.

Referring to FIG. 7B, when the geofence server determines that the current location of the reporting application's computing device is associated with a stored blended geofence (i.e., determination block 702="Yes"), the geofence server may generate a list of geofence-enabled applications and geofences that are associated with the stored blended geofence in block 722. As described above, the stored blended geofence may be associated with a particular combination of geofence-applications and their respective geofences.

In an embodiment, a stored blended geofence may only be suitable for use on the reporting application's computing device when there is an exact match because the stored blended geofence may not otherwise accurately represent a blended geofence generated for the geographically close geofences at the reporting application's computing device current location. For example, a stored blended geofence representing geofence-enabled applications A, B, and C and geofences 1, 2, and 3 may significantly degrade the accuracy of location-based services on a reporting application's computing device when the computing device only includes geofence-enabled applications A and B and only geofences 1 and 2 at the current location. In another example, the stored blended application may include geofence-enabled applications A, B, and C and geofences 1, 2, and 3, but the reporting application's computing device may include geofence-enabled applications A, B, C, and D and geofences 1, 2, 3, 4, and 5. Thus, in this example, the stored blended geofence may not accurately represent geofence-enabled application D and geofences 4 and 5, which may also greatly affect the accuracy of location-based services for geofence-enabled applications on the reporting application's computing device.

Therefore, in determination block 724, the geofence server may determine whether there is an exact match between the geofence-enabled applications and geofences in the list and the geofence-enabled applications and geographically close geofences currently associated with the reporting application's computing device. In an embodiment, the geofence server may accomplish this operation by comparing the geofence-enabled applications in the list with the geofence-enabled applications determined to be currently associated with the reporting application's computing device in block 410 of method 400 described with reference to FIG. 4A. Similarly, the geofence server may compare the geofences in the list with the geofences determined to be geographically close in the operations in block 414 of method 400 described above with reference to FIG. 4A.

When the geofence server determines that there is not an exact match (i.e., determination block 724="No"), the geofence server may send unblended geofence information to the reporting application in block 614 of method 600 described above with reference to FIG. 6. In other words, even though there is a blended geofence associated with the current location of the reporting application's computing device, the reporting application may not receive the blended geofence when there is not an exact match between the geofence-enabled applications and geofences associated with the reporting application's computing device and those included in the list because the stored blended geofence may not be suitable for use by the geofence-enabled applications on the reporting application's computing device as described above. Thus, instead of sending the blended geofence, the geofence server may send update information regarding the reporting application's geofences as originally defined by the reporting application's developers.

When the geofence server determines that there is an exact match (i.e., determination block 724="Yes"), the geofence server may send the stored blended geofence to the reporting application in block 728. After sending blended or unblended geofence information to the reporting application, the geofence server may execute the embodiment process of method 400 in a continuous loop by performing the operations in block 402 as described above with reference to FIG. 4A so that the geofence server continuously monitors whether it has received a geofence crossing notification from another reporting application.

In further embodiments, the computing device may include a geofence management unit that may be configured to manage and/or send blended geofences to a plurality of geofence-enabled applications operating on the computing device.

In an embodiment, the geofence management unit may execute on the computing device to act as a proxy geofence server on behalf of the other geofence applications on the computing device. In this embodiment, the geofence management unit may receive geofence parameter information for each of the geofence-enabled applications from the applications themselves or from the geofence server. The geofence management unit may combine the geofence-enabled applications' geofences into a single, blended geofence.

In another embodiment, the geofence management unit may monitor the position of the computing device to detect when the blended geofence is satisfied, and when it is, may send a notification that the blended geofence has been crossed to each application on the computing device nearly simultaneously. This may enable each application to act independently as if it had determined that its geofence was crossed. Since the applications are notified at the same time, the use of location-sensing radios is minimized and a single connection to the geofence server may be established to support all of the applications. In an alternative embodiment, the geofence management unit may send the blended geofence to each of the geofence-enabled applications on the computing device, which may then operate as described above as if they had received the redrawn geofence from the geofence server.

Figure 8:
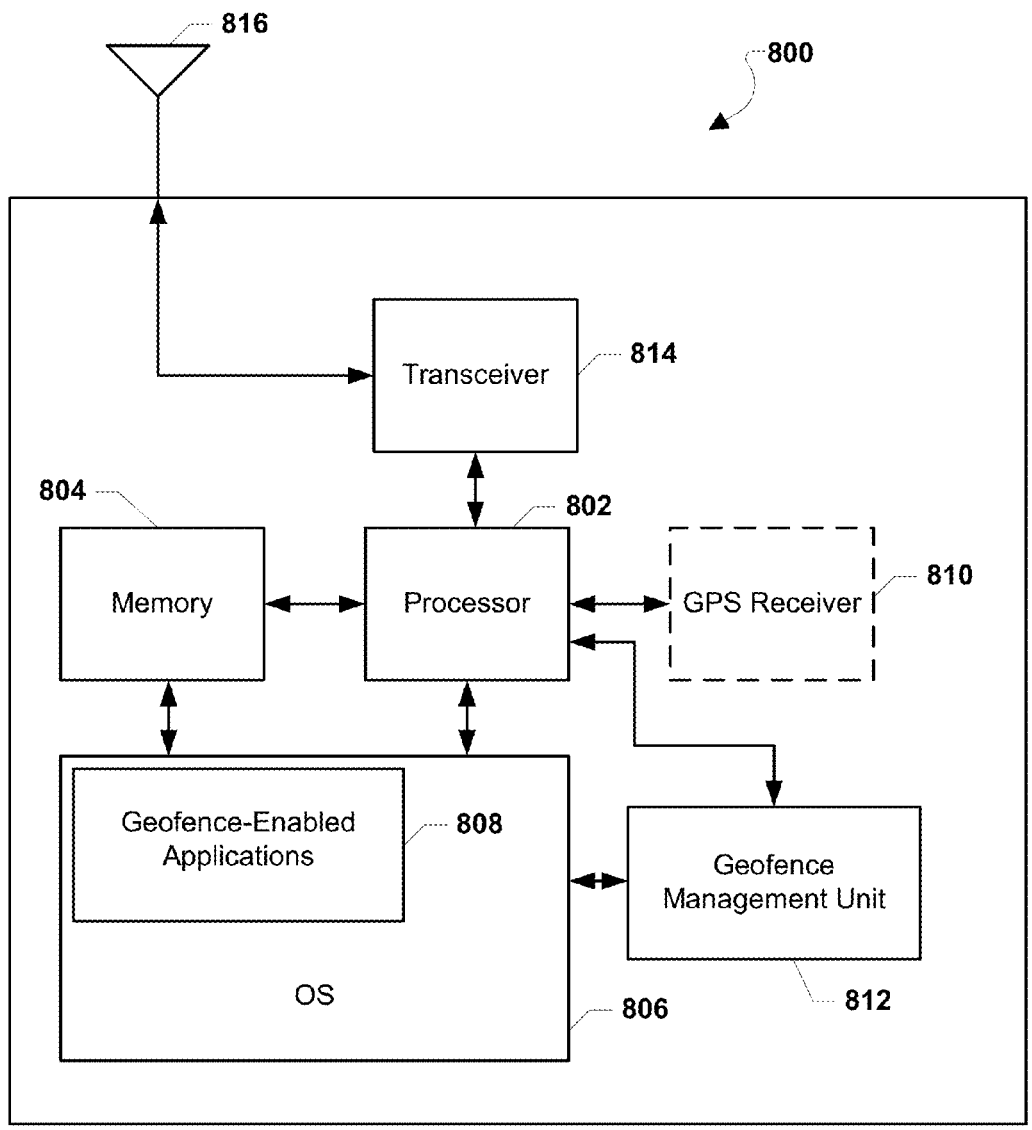
FIG. 8 is a block diagram illustrating example logical components and information flows in an embodiment computing device configured to determine, generate, and/or manage blended geofences for geofence-enabled applications operating on the computing device.

FIG. 8 is a component block diagram of an embodiment computing device 800 that includes a geofence management unit 812 for use in managing and blending the geofences of one or more geofence-enabled applications.

In an embodiment, the computing device 800 may include a processor 802. The processor 802 may be a multi-core host processor, and the processor 802 may be any of a variety of programmable processors capable of running applications and/or an operating system for managing such applications. For example, the processor 802 may persistently execute a high-level operating system (i.e., OS 806) and may perform numerous routines to utilize the components and software of the computing device 800. The processor 802 may also store data within and retrieve data from a memory component 804 that may be external and/or on-chip memory.

In another embodiment, one or more geofence-enabled applications 808 may operate on top of the OS 806 and may be executed by the processor 802. The geofence-enabled applications 808 may determine the computing device 800's current location using various techniques. For example, the geofence-enabled applications 808 may receive the computing device 800's current location from an optional GPS receiver 810. In another example, the geofence-enabled applications 808 may determine the computing device 800's current location using various local positioning systems, such as by utilizing a radio-frequency transceiver 814 and one or more antennae 816 to receive signals from multiple Wi-Fi access points, Bluetooth beacons, cell sites, base stations, etc. In another embodiment, the geofence-enabled applications may utilize both GPS and various local positioning systems.

In another embodiment, the computing device 800 may include a geofence management unit 812 configured to manage and/or blend the geofences for the geofence-enabled applications 808. The geofence management unit 812 may receive information regarding the geofence-enabled applications' geofences, either from the geofence-enabled applications 808 or from the geofence server (not shown). The geofence management unit 812 may also combine the geofences of the geofence-enabled applications 808 that overlap and/or that are close in proximity in the current location using the same or similar methods of blending geofences as attributed to the geofence server as described above.

In another embodiment, the geofence management unit 812 may determine the current location of the computing device 800 as described above (e.g., using GPS and/or local positioning systems) and may at one time alert the geofence-enabled applications 808 when the blended geofence has been crossed so that the geofence-enabled applications 808 may simultaneously or nearly simultaneously communicate with the geofence server. In an alternative embodiment, the geofence management unit 812 may be configured to serve as an intermediary between the geofence-enabled applications 808 and the geofence server. In such an embodiment, the geofence management unit 812 may receive geofence information for the geofence-enabled applications 808 from the geofence server, combine the geofences into a single blended geofence, monitor the computing device 800's current location until the blended geofence is crossed, notify the geofence server of the geofence crossing, and receive updated geofence information from the geofence server on behalf of the geofence-enabled applications 808.

While the geofence management unit 812 is illustrated in FIG. 8 as a separate component included on the computing device 800, the geofence management unit may be implemented on the computing device 800 in various ways. For example, the geofence management unit 812 may be one of the geofence-enabled applications 808 or a standalone program running on top of the OS 806 and may be executed by a processor included on the computing device 800 (e.g., processor 802). In another example, the geofence management unit may be implemented as part of the OS 806, such as a background process or service. In another example, the geofence management unit may be implemented in hardware, such as a logic circuit included in the processor 802 or in the optional GPS receiver 810. However, it is anticipated that the geofence management unit 812 may function in the same capacity regardless of the particular manner in which it is implemented.

Further, for ease of description, the geofence management unit may be described as performing one or more operations of one or more of the embodiment methods described below. However, in embodiments in which the geofence management unit is implemented in software, it should be understood that such operations may be performed by a computing device processor (e.g., processor 802) executing the geofence management unit software.

Other components that may be included on the computing device 800 are further described below with reference to FIG. 16.

Figure 9A:
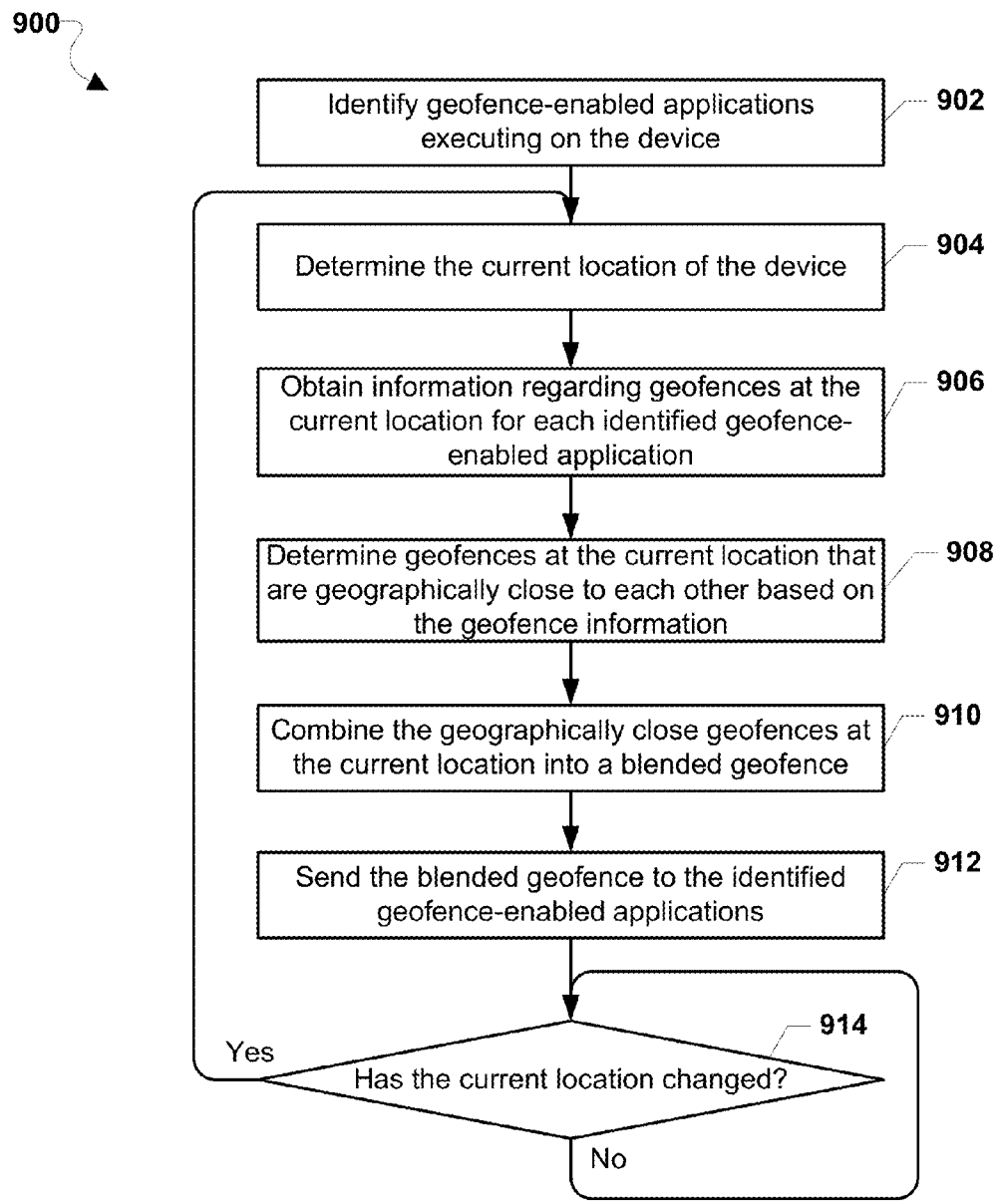
FIG. 9A is a process flow diagram illustrating an embodiment method for sending a blended geofence from a geofence management unit to geofence-enabled applications operating on a computing device based on the current location of the computing device.
Figure 9B:
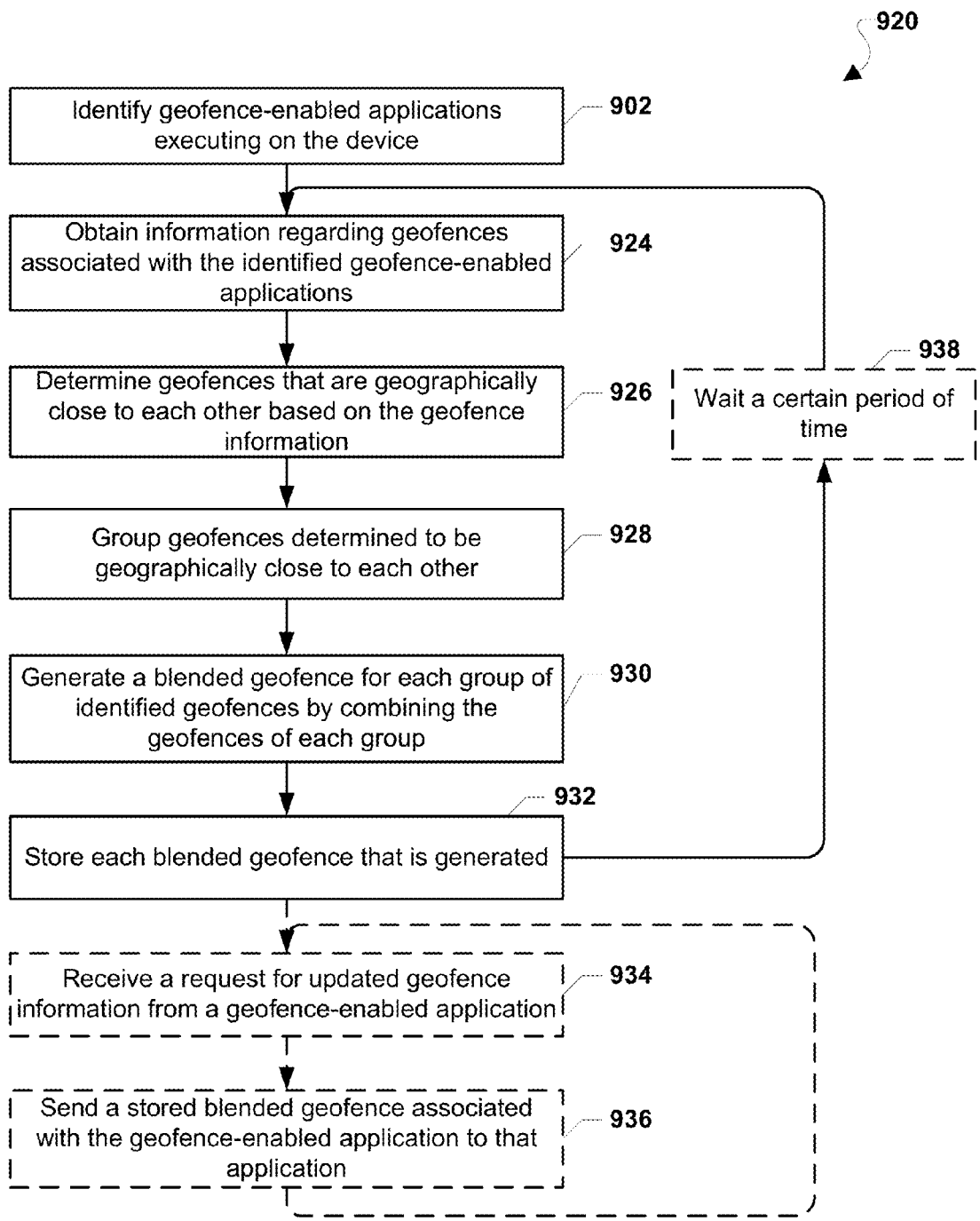
FIG. 9B is a process flow diagram illustrating another embodiment method for sending a blended geofence from a geofence management unit to geofence-enabled applications operating on a computing device.

FIGS. 9A and 9B illustrates embodiment methods 900, 920 that may be performed by a processor executing the geofence management unit on a computing device for generating blended geofences locally on the device.

As described above with reference to FIGS. 4A and 4B, for ease of description, various embodiments, such as those described below with reference to FIGS. 9A-15C, may include operations that include or depend on the current location of the computing device. However, any reference to or dependency on the current location of the computing device is not intended to limit the scope of the claims unless explicitly recited in the claims.

FIG. 9A illustrates an embodiment method 900 that may be implemented by a geofence management unit operating on a computing device for managing a plurality of geofence-enabled applications operating on the same computing device. In an embodiment, the geofence management unit may combine overlapping or close-by geofences in the computing device's current location into a single, blended geofence that the geofence management unit may send to a plurality of geofence-enabled application operating on the computing device.

In block 902, the geofence management unit may identify a plurality of geofence-enabled applications executing on the computing device. In an embodiment, each geofence-enabled application may register with the geofence management unit. For example, each geofence-enabled application may include instructions that configure the geofence-enabled application to send its identification information (e.g., application ID, geofence server ID, etc.) to the geofence management unit.

In block 904, the geofence management unit may determine the current location of the computing device. In an embodiment, the geofence management unit may utilize the computing device's GPS receiver and/or various local-positioning components on the computing device to determine the computing device's current location as discussed above.

In block 906, the geofence management unit may obtain information regarding geofences at the current location for each identified geofence-enabled application. In an embodiment, the geofence management unit may communicate with the geofence server and request the geofences associated with the plurality of geofence-enabled applications operating on the computing device. In another embodiment, the geofence management unit may request geofence information from the plurality of geofence-enabled applications, which may receive such geofence information from the geofence server. In another embodiment, the geofence information for the plurality of geofence-enabled applications may include information regarding the geofences' shapes, perimeters, geographical locations, and sizes.

In block 908, the geofence management unit may determine the geofences at the current location that are geographically close based on the geofence information. In an embodiment, as discussed above with reference to the geofence server, the geofence management unit may perform various calculations to determine whether the geofences for the geofence-enabled applications on the computing device are overlapping and/or in close proximity. For example, the geofence management unit may determine the area and/or perimeter of each of the geofences in the computing device's current area and may determine whether a plurality of the geofences have areas and/or perimeters that overlap or that are almost overlapping.

In block 910, the geofence management unit may combine the geographically close geofences at the current location into a blended geofence. The geofence management unit may implement various techniques to combine the geofences. For example, the geofence management unit may generate a blended geofence that encompasses each of the separate overlapping geofences or that represents a centered-shape of the geofences using a weighted average of the geofences' shapes. Combining the geofences into a blended geofence is further described below with reference to FIGS. 15A-15C.

In block 912, the geofence management unit may send the blended geofence to each of the identified geofence-enabled applications associated with a geofence included in the blended geofence. For example, the geofence management unit may send information regarding the blended geofence that may enable each of the geofence-enabled applications to monitor the blended geofence. As a result, the plurality of geofence-enabled applications may utilize the output of the location-sensing radios at the same time to recognize when the blended geofence is crossed, and each of the plurality of geofence-enabled applications may communicate with the geofence server at the same or nearly the same time.

In determination block 914, the geofence management unit may determine whether the current location has changed. In an embodiment, the geofence management unit may periodically check whether the computing device has moved to a different location in which there may be different geofences. For example, the geofence management unit may determine whether the computing device has moved from a mall location to a parking lot location.

When the geofence management unit determines that the current location has not changed (i.e., determination block 914="No"), the geofence management unit may continuously repeat the process in determination block 914 to recognize when the current location has changed. When the geofence management unit determines that the current location has changed (i.e., determination block 914="Yes"), the geofence management unit may continue performing this process in a loop as the geofence management unit may continue determining the current location of the computing device in block 904.

In a further embodiment, the geofence management unit may perform the operations described above to combine multiple geographically close geofences for a single geofence-enabled application into a blended geofence, thereby enabling the single geofence-enabled application to monitor a single, blended geofence rather than multiple individual geofences.

FIG. 9B illustrates an embodiment method 920 that may be implemented by a processor executing a geofence management unit on a computing device for blending geographically close groups of geofences for geofence-enabled applications on the computing device. In an embodiment, the computing device processor may preemptively group together geographically close geofences associated with geofence-enabled applications operating on the computing device, and the processor may combine each of those groups of close geofences into a blended geofence for use by one or more of those applications or by a geofence management unit that monitors the blended geofence on behalf of the applications whose geofences are encompassed in a blended geofence.

In another embodiment, the processor executing the geofence management unit may periodically (e.g., nightly or weekly) create and store all possible blended geofences available for the geofence-enabled applications operating on the computing device. Thus, in a further embodiment, on its own or in response to receiving a geofence crossing notification or another request for geofence information from an application on the computing device, the processor executing the geofence management unit may quickly access a stored blended geofence associated with a geofence-enabled application on the computing device and may send the stored blended geofence to that application. In other words, the processor executing the geofence management unit may prepare pre-generated blended geofences for applications and may send those pre-made blended geofences to the applications as needed or requested.

In block 902, the processor executing the geofence management unit may identify geofence-enabled applications executing on the device as described above with reference to FIG. 9A. The processor executing the geofence management unit may also obtain information regarding geofences associated with the identified geofence-enabled application in block 924, such as by requesting geofence information about the applications from a geofence server or by requesting geofence information directly from the applications. In an embodiment, the processor executing the geofence management unit may only obtain information for geofences within a certain distance from the mobile device or for geofences associated with a particular area (e.g., a certain portion of a state or region). In another embodiment, the processor executing the geofence management unit may receive information for geofences regardless of their locations.

In block 926, the processor executing the geofence management unit may determine the geofences associated with the identified geofence-enabled applications that are geographically close to each other based on the geofence information. As generally described above, geofences may be geographically close to each other when their perimeters are within a certain distance of each other or when their areas have a certain degree of overlap. In block 928, the processor executing the geofence management unit may group those geofences determined to be geographically close in block 926.

In block 930, the processor executing the geofence management unit may generate a blended geofence for each group of geofences by combining the geofences in each group. In an embodiment, by performing the operations of block 930, the processor executing the geofence management unit may generate every possible blended geofence (or a particular subset of possible blended geofences) available to the geofence-enabled applications on the computing device. In block 932, the processor executing the geofence management unit may also store each blended geofence that is generated in block 930 for later use.

In an optional embodiment, the processor executing the geofence management unit may wait a certain period of time in optional block 938 and may repeat the operations described above starting in block 924. In other words, the processor executing the geofence management unit may repeat the above operations periodically after the certain period of time elapses to ensure that the stored blended geofences are up to date.

In further embodiments that may occur simultaneously with or after the above operations, the processor executing the geofence management unit may receive a request for updated geofence information (e.g., a geofence crossing notification) from a geofence-enabled application in optional block 934. The processor executing the geofence management unit may also send a stored blended geofence associated with the geofence-enabled application to that application in optional block 936. For example, the processor executing the geofence management unit may send a stored blended geofence to the geofence-enabled application associated with one or more geofences that were used to form the blended geofence as described above in block 930. The processor may repeat the above operations in a loop starting in optional block 934.

Thus, in an embodiment, the processor executing the geofence management unit may store the blended geofences in memory in block 932 and may send the blended geofences to the geofence-enabled applications in optional block 936 as needed (e.g., in response to a reporting notification from a reporting application as generally described below with reference to FIG. 12.). In another embodiment of the operations of optional block 936, the processor executing the geofence management unit may preemptively send geofence-enabled applications on the computing device stored blended geofences (e.g., in a "push" operation) to enable those applications to begin monitoring the blended geofence immediately. In a further embodiment (not shown), the geofence management unit may monitor the stored blended geofences on behalf of the applications whose geofences are encompassed in a blended geofence, and may signal those applications when a stored blended geofence has been crossed.

Figure 10A:
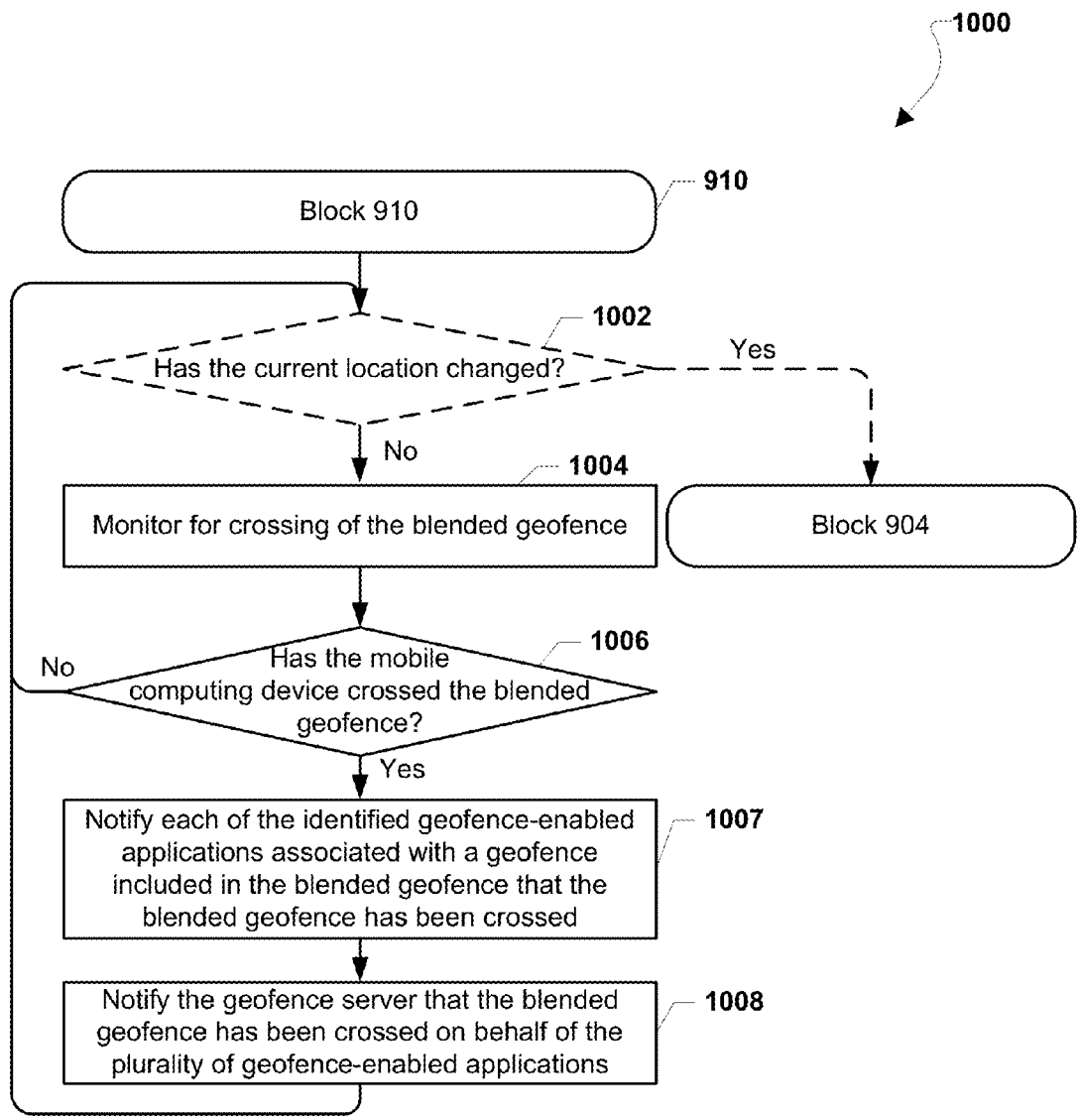
FIG. 10A is a process flow diagram illustrating an embodiment method for notifying a geofence server when a blended geofence is satisfied on behalf of geofence-enabled applications operating on a computing device.

FIG. 10A illustrates an embodiment method 1000 that may be implemented by a geofence management unit operating on a computing device for notifying geofence-enabled applications operating on the computing device when the computing device has crossed a blended geofence. In an embodiment, the geofence management unit may serve as an intermediary between the geofence-enabled applications and the geofence server by generating a blended geofence, monitoring the blended geofence, and notifying the geofence server on behalf of the geofence-enabled applications when the blended geofence is crossed.

In an embodiment, the operations of method 1000 implement an embodiment of the operations of block 912 of method 900 described above with reference to FIG. 9A. Thus, in an embodiment, the geofence management unit may begin performing method 1000 after combining the overlapping or nearly overlapping geofences at the current location into a blended geofence in block 910 of method 900 described above with reference to FIG. 9A.

In optional determination block 1002, the geofence management unit may determine whether the current location has changed. In other words, the geofence management unit may compare the computing device's current location to a previously determined location to determine whether the computing device has moved. In another embodiment, the geofence management unit may determine a current location has changed when the computing device has moved a certain threshold distance.

When the geofence management unit determines that the current location has changed (i.e., optional determination block 1002="Yes"), the geofence management unit may continue performing the process in block 904 of method 900 described above with reference to FIG. 9A by determining the computing device's current location. In an embodiment, each location may include different geofences in different positions, and the geofence management unit may need to combine geofences in each location differently to generate a blended geofence for that area.

When the geofence management unit determines that the current location has not changed (i.e., optional determination block 1002="No"), the geofence management unit may monitor for crossing of the blended geofence in block 1004. In other words, the geofence management unit may monitor whether the computing device has crossed the border of the blended geofence.

In determination block 1006, the geofence management unit may determine whether the computing device has crossed the blended geofence. In an embodiment, the geofence management unit may utilize GPS and/or local-positioning systems (e.g., Wi-Fi, cell tower signals, etc.) to determine whether the computing device has crossed the blended geofence. When the geofence management unit determines that the computing device has not crossed the blended geofence (i.e., determination block 1006="No"), the geofence management unit may continue performing the process in optional determination block 1002. In an embodiment, the geofence management unit may continually determine whether the computing device's current location has changed as described above.

When the geofence management unit determines that the computing device has crossed the blended geofence (i.e., determination block 1006="Yes"), the geofence management unit may notify each of the identified plurality of geofence-enabled applications associated with a geofence included in the blended geofence that the blended geofence has been crossed in block 1007. The geofence management unit may also notify the geofence server that the blended geofence has been crossed on behalf of the geofence-enabled applications associated with a geofence included in the blended geofence in block 1008. In an embodiment, the geofence management unit may be responsible for monitoring for geofence breaches instead of each of the plurality of geofence-enabled applications, thereby minimizing the usage of the location-sensing radios, and the geofence management unit may inform the geofence server when the blended geofence is crossed instead of each of the plurality of geofence-enabled applications. In a further embodiment, the geofence management unit may notify geofence server of the blended geofence crossing in one communication, thereby saving time and/or resources (e.g. power) on the computing device.

The process may continue in a loop as the geofence management unit may continue determining whether the current location has changed in optional determination block 1002.

Figure 10B:
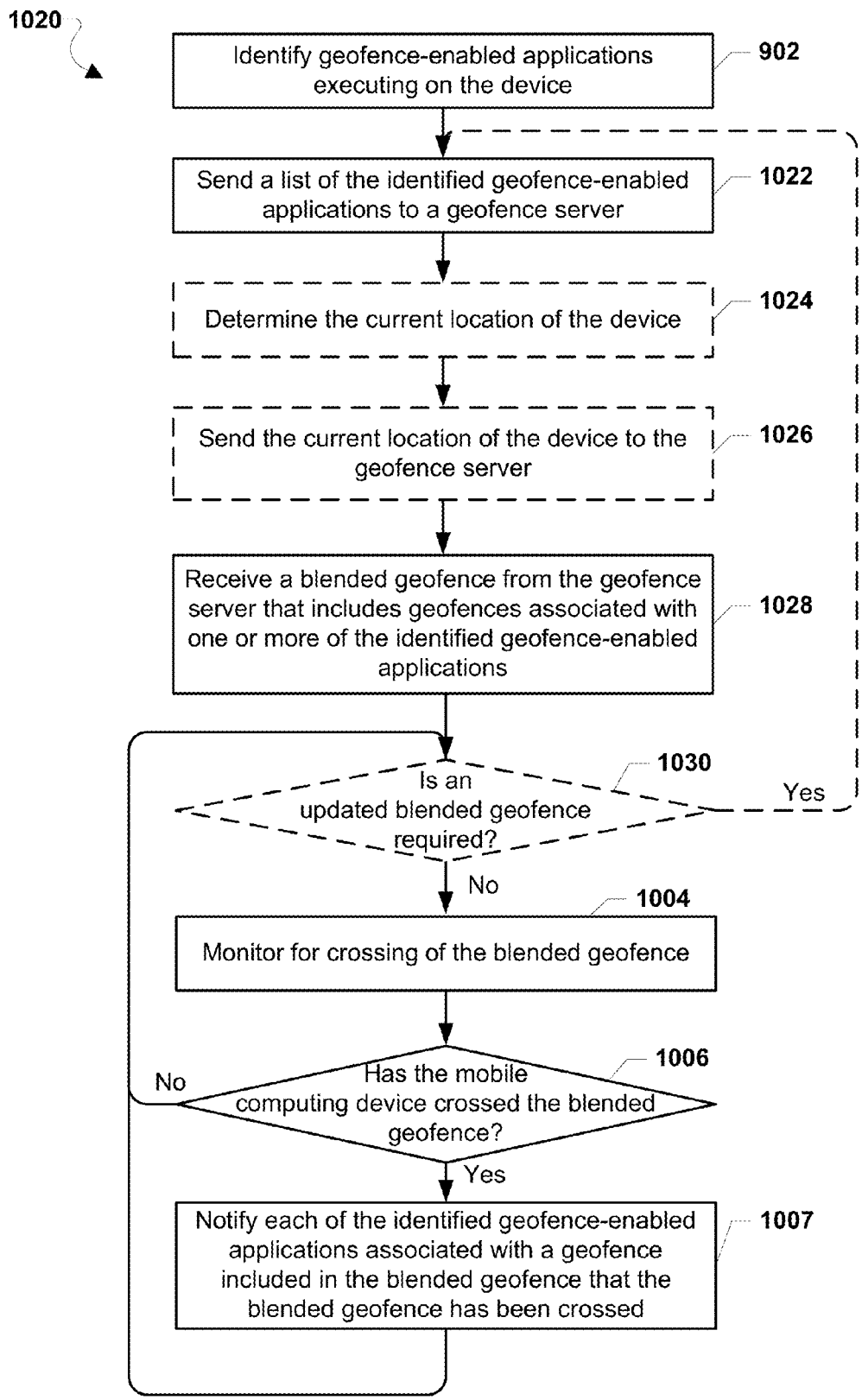
FIG. 10B is a process flow diagram illustrating an embodiment method for implementing a proxy server application on a computing device to monitor for and report when a blended geofence received from a geofence server is crossed.

FIG. 10B illustrates an embodiment method 1020 that may be implemented by a geofence management unit operating on a computing device for notifying geofence-enabled applications operating on the computing device when a blended geofence has been crossed.

In an embodiment, the geofence management unit may be an application executing on a processor of the computing device and serving as a proxy server for the one or more geofence-enabled applications also executing on the device processor. In such an embodiment, the computing device processor executing the geofence management unit may request a blended geofence from a geofence server, monitor the computing device's current location on behalf of the geofence-enabled applications, and notify each of the geofence-enabled applications that is associated with a geofence included in the blended geofence when the blended geofence is crossed.

In block 902, the computing device processor executing the geofence management unit may identify the geofence-enabled applications executing on the device as described above with reference to FIG. 9A. The computing device processor executing the geofence management unit may send a list of the identified geofence-enabled applications to the geofence server in block 1022. In an embodiment, the list may enable the geofence server to identify geofences associated with the listed geofence-enabled applications, determine the identified geofences that are geographically close, generate a blended geofence based on those geographically close geofences, and send the generated blended geofence to the computing device as generally discussed above with reference to the various embodiments described above with reference to FIGS. 4A-7B.

In an optional embodiment, the computing device processor executing the geofence management unit may determine the current location of the device in optional block 1024. The computing device processor executing the geofence management unit may send the current location of the device to the geofence server in optional block 1026, thereby enabling the geofence server to generate a blended geofence for the geofence-enabled applications' geofences that are geographically close to the device's current location.

In block 1028, the computing device processor executing the geofence management unit may receive a blended geofence from the geofence server that includes geofences associated with one or more of the listed geofence-enabled applications. In an embodiment, the blended geofence may include geofences that are geographically close to the computing device's current location. In another embodiment, the computing device processor executing the geofence management unit may receive one or more blended geofences that represent every possible blended geofence or a particular subset of blended geofences (e.g., blended geofences for a particular geographic region or area). In such an embodiment, the computing device processor executing the geofence management unit may identify a blended geofence that is relevant to the current location of the computing device and begin monitoring that identified (i.e., relevant) blended geofence as further described below.

After receiving the blended geofence from the geofence server in block 1028, the computing device processor executing the geofence management unit may optionally determine whether an updated blended geofence is required in optional determination block 1030. For example, the computing device processor executing the geofence management unit may determine that a blended geofence previously received from the geofence server is no longer relevant or useful because the computing device has moved to another area not covered by the blended geofence. When the computing device processor executing the geofence management unit determines that an updated blended geofence is required (i.e., optional determination block 1030="Yes"), the processor may repeat the above operations starting in block 1022 in order to request an updated blended geofence.

When the computing device processor executing the geofence management unit determines that an updated blended geofence is not required (i.e., optional determination block 1030="No"), the processor may monitor for crossing of the blended geofence in block 1004 as described above with reference to FIG. 10A.

The computing device processor executing the geofence management unit may also determine whether the computing device has crossed the blended geofence in determination block 1006 as described above with reference to FIG. 10A. Until the computing device processor executing the geofence management unit determines that the computing device has not crossed the blended geofence (i.e., while determination block 1006="No"), the processor may repeat the above operations starting in optional determination block 1030. When the computing device processor executing the geofence management unit determines that the computing device has crossed the blended geofence (i.e., determination block 1006="Yes"), the processor may notify each of the identified geofence-enabled applications associated with a geofence included in the blended geofence that the blended geofence has been crossed in block 1007 as further described above with reference to FIG. 10A.

Figure 11:
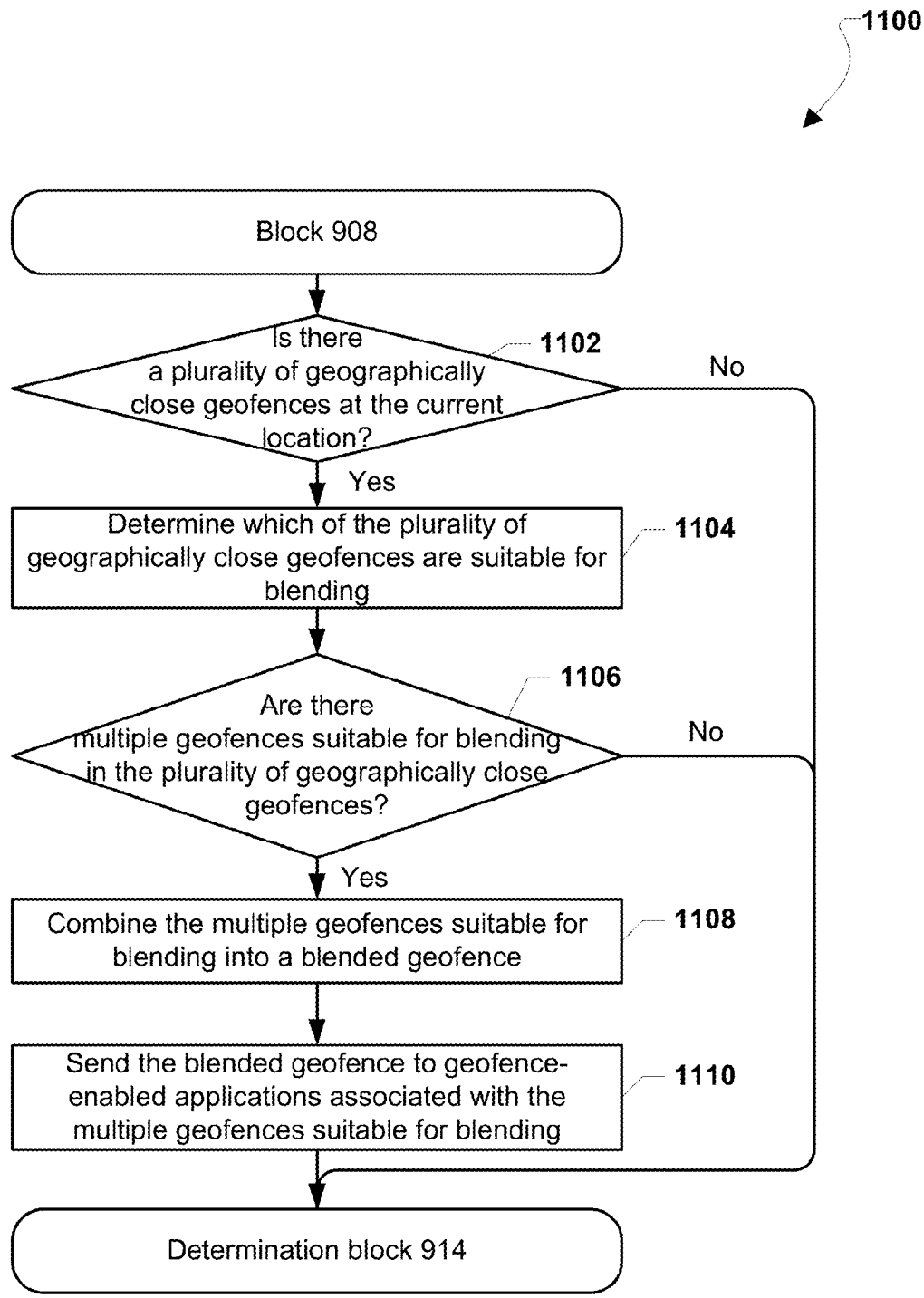
FIG. 11 is a process flow diagram illustrating an embodiment method for sending a blended geofence to geofence-enabled applications associated with the geofences included in the blended geofence.

FIG. 11 illustrates an embodiment method 1100 that may be implemented by a geofence management unit operating on a computing device for combining compatible geofences for geofence-enabled applications on the computing device. The operations of method 1100 implement an embodiment of the operations of method 900 described above with reference to FIG. 9A. Thus, in an embodiment, the geofence management unit may begin performing method 1100 after determining the geofences at the current location that are geographically close based on the geofence information in block 908 of method 900.

In determination block 1102, the geofence management unit may determine whether there is a plurality of geographically close geofences at the current location. In other words, the geofence management unit may determine whether it is possible to combine any geofences in the current location. For example, the geofence management unit may be unable to combine geofences in the current location when there is only one geofence in the current location or a plurality of geofences in the area that are not close to each other.

When the geofence management unit determines that there is not a plurality of geographically close geofences at the current location (i.e., determination block 1102="No"), the process may continue in determination block 914 of method 900 described above with reference to FIG. 9A when the geofence management unit determines whether the computing device's current location has changed.

When the geofence management unit determines that there is a plurality of geographically close geofences at the current location (i.e., determination block 1102="Yes"), the geofence management unit may determine which of the plurality of geographically close geofences are suitable for blending in block 1104. As described above with reference to block 604 in method 600 described above with reference to FIG. 6, overlapping and/or close-by geofences may nonetheless by unsuitable for blending for various reasons. For example, a geofence may include metadata added by a developer that marks the geofence as ineligible for blending (e.g., for an application that requires a high degree of location-based accuracy to function as intended). Other incompatibilities may include incompatible geofence shapes (e.g., a square geofence and a circular geofence) or incompatible geofence types (e.g., a "walking" geofence and a "driving" geofence).

In determination block 1106, the geofence management unit may determine whether there are multiple geofences suitable for blending in the plurality of overlapping geofences. In other words, the geofence management unit may determine whether there are at least two geofences that are eligible to be combined into a blended geofence. When the geofence management unit determines that there are not multiple geofences suitable for blending in the plurality of geographically close geofences (i.e., determination block 1106="No"), the process may continue in determination block 914 of method 900 described above with reference to FIG. 9A when the geofence management unit determines whether the computing device's current location has changed.

When the geofence management unit determines that there are multiple geofences suitable for blending in the plurality of geographically close geofences (i.e., determination block 1106="Yes"), the geofence management unit may combine the multiple compatible geofences into a blended geofence in block 1108. In an embodiment, when there are multiple compatible geofences, the geofence management unit may be able to combine them into a blended geofence.

In block 1110, the geofence management unit may send the blended geofence to geofence-enabled applications associated with the multiple geofences suitable for blending. In other words, only those applications that have geofences in the current location that are suitable for blending may receive the blended geofences, and other geofence-enabled applications may not receive the blended geofence. In an embodiment, the other geofence-enabled applications may continue monitoring the geofences originally defined by their application developers because those geofences were not combined into the blended geofence.

The process may continue in determination block 914 of method 900 described above with reference to FIG. 9A when the geofence management unit determines whether the computing device's current location has changed.

Figure 12:
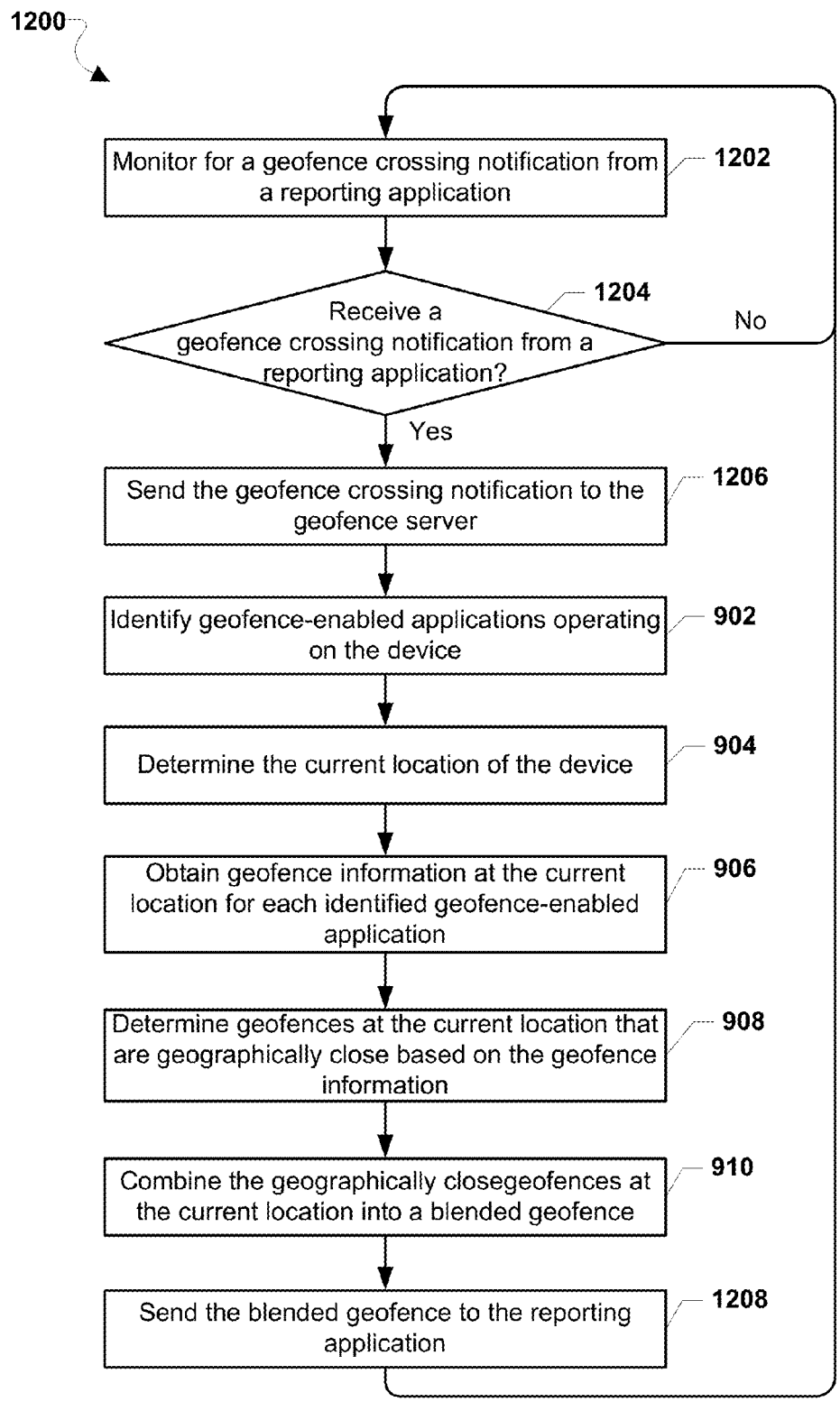
FIG. 12 is a process flow diagram illustrating an embodiment method for sending a blended geofence from a geofence management unit to a reporting application on a computing device.

FIG. 12 illustrates an embodiment method 1200 that may be implemented by a geofence management unit operating on a computing device for sending a blended geofence to a reporting application in response to receiving a geofence crossing notification from the reporting application. In further embodiments, the geofence management unit may serve as an intermediary between a plurality of geofence-enabled applications operating on the computing device and a geofence server.

In block 1202, the geofence management unit may monitor for a geofence crossing notification from a reporting application. In an embodiment, the geofence-enabled applications may individually monitor for geofence crossings and may indicate when a geofence has been crossed by sending a geofence crossing notification to the geofence management unit (i.e., instead of the geofence server directly), and the geofence management unit may return information for blended geofences to the plurality of geofence-enabled application in response as described below.

In determination block 1204, the geofence management unit may determine whether it has received a geofence crossing notification from a reporting application. When the geofence management unit determines that it has not received a geofence crossing notification from a reporting application (i.e., determination block 1204="No"), the process may continue in a loop as the geofence management unit may continue performing method 1200 in block 1202 until the geofence management unit receives a geofence crossing notification.

When the geofence management unit determines that it has received a geofence crossing notification from a reporting application (i.e., determination block 1204="Yes"), the geofence management unit may send the geofence crossing notification to the geofence server in block 1206. In an embodiment, the geofence management unit may serve as an intermediary between the reporting application and the geofence server. In such an embodiment, the geofence management unit may alert the geofence server when a geofence-enabled application on the computing device crosses a geofence, and the geofence management unit may receive updated geofence information from the geofence server on behalf of the geofence-enabled application. In another embodiment, as described above, the geofence management unit may also receive geofence information for other geofence-enabled applications operating on the same computing device and generate a blended geofence that is monitored by each geofence-enabled application on the same computing device.

The geofence management unit may continue performing method 1200 by performing the operations in blocks 902-910 of method 1200 as described above in block 902-910 of method 900 described above with reference to FIG. 9A. In an embodiment, the geofence management unit may identify the geofence-enabled applications operating on the computing device, determine the current location of the computing device, obtain geofence information for the current location for each identified geofence-enabled application (e.g., from the geofence server), determine the geofences present at the current location that are geographically close based on the geofence information, and combine the overlapping geofences at the current location into a blended geofence.

After generating the blended geofence in block 910, the geofence management unit may send the blended geofence to the reporting application in block 1208. In an embodiment, the geofence management unit may continue performing method 1200 for other reporting applications. Thus, eventually, the geofence management unit may send the blended geofence for the current location to each geofence-enabled application on the computing device, and each geofence-enabled application on the computing device may be able to simultaneously or nearly simultaneously detect when the computing device crosses the blended geofence.

In a further embodiment, the geofence management unit may perform the operations described above to combine multiple geographically close geofences associated with the reporting application into a blended geofence, thereby enabling the reporting application to monitor a single, blended geofence rather than multiple individual geofences.

Figure 13:
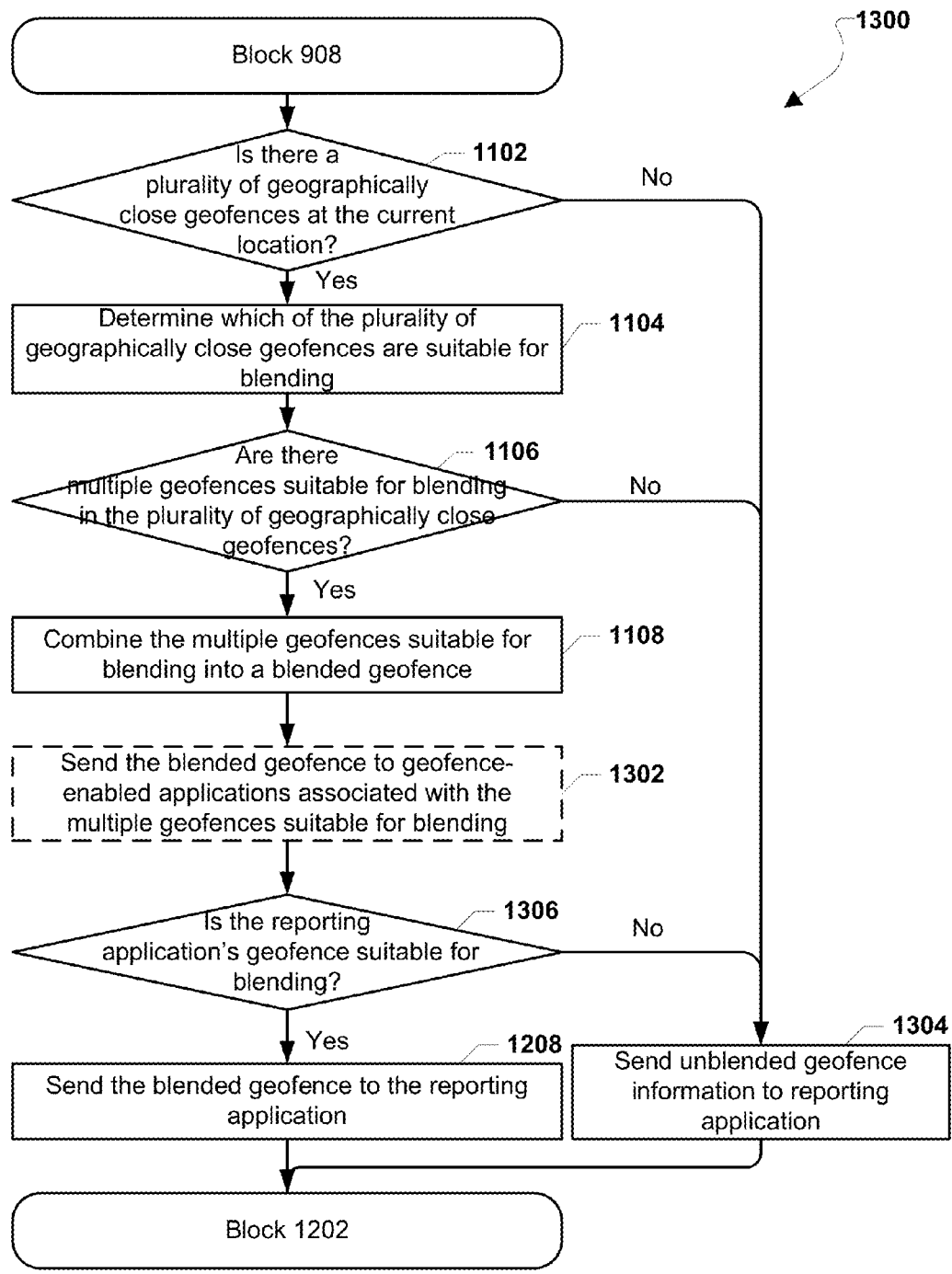
FIG. 13 is a process flow diagram illustrating an embodiment method for determining whether to send a blended geofence or unblended geofence information from a geofence management unit to a reporting application.

FIG. 13 illustrates an embodiment method 1300 that may be implemented by a geofence management unit operating on a computing device for determining whether to send a blended geofence or unblended geofence information to a reporting application. The operations of method 1300 implement an embodiment of the operations of method 1200 described above with reference to FIG. 12. Thus, in an embodiment, the geofence management unit may begin performing method 1300 after determining the geofences at the current location that overlap and/or are in close proximity based on the geofence information in block 908 of method 1200 described above with reference to FIG. 12.

In determination block 1102, the geofence management unit may determine whether there is a plurality of geographically close geofences at the current location. In other words, as described above with reference to FIG. 11, the geofence management unit may determine whether it is possible to combine any geofences in the current location.

When the geofence management unit determines that there is not a plurality of geographically close geofences at the current location (i.e., determination block 1102="No"), the geofence management unit may send unblended geofence information to the reporting application in block 1304. In an embodiment, the geofence management unit may be unable to generate a blended geofence when there is not a plurality of geofences present at the computing device's current location because more than one geofence is needed in order to generate a blended geofence. In another embodiment, the process may continue in block 1202 in method 1200 described above with reference to FIG. 12 as the geofence management unit may monitor for a geofence crossing notification from another reporting application.

When the geofence management unit determines that there is a plurality of geographically close geofences at the current location (i.e., determination block 1102="Yes"), the geofence management unit may determine which of the plurality of geographically close geofences are suitable for blending in block 1104 as described above with reference to block 604 in method 600 described above with reference to FIG. 6.

In determination block 1106, the geofence management unit may determine whether there are multiple geofences suitable for blending in the plurality of geographically close geofences. In other words, the geofence management unit may determine whether there are at least two geofences that are eligible to be combined into a blended geofence. When the geofence management unit determines that there are not multiple geofences suitable for blending in the plurality of geographically close geofences (i.e., determination block 1106="No"), the geofence management unit may send unblended geofence information to the reporting application in block 1304. The process may continue in block 1202 in method 1200 described above with reference to FIG. 12 as the geofence management unit may monitor for a geofence crossing notification from another reporting application.

When the geofence management unit determines that there are multiple geofences suitable for blending in the plurality of geographically close geofences (i.e., determination block 1106="Yes"), the geofence management unit may combine the multiple geofences suitable for blending into a blended geofence in block 1108. For example, the geofence management unit may generate a single geofence based on the weighted averages of the compatible geofences.

In optional block 1302, the geofence management unit may send the blended geofence to the geofence-enabled applications associated with the multiple geofences suitable for blending. In an embodiment, the geofence management unit may update each geofence-enabled application on the computing device that has a geofence included in a blended geofence. In an embodiment, by preemptively pushing the blended geofence to geofence-enabled applications associated with the multiple compatible geofences, the geofence management unit may immediately enable those applications to begin monitoring the blended geofence. Thus, the geofence server may avoid having to send the blended geofence to those geofence-enabled applications in response to receiving geofence crossing notifications from each of those applications at a later time.

In determination block 1306, the geofence management unit may determine whether the reporting application's geofence is suitable for blending. In other words, the geofence management unit may determine whether the reporting application's geofence is included in the multiple geofences suitable for blending as described above with reference to determination block 1106.

When the geofence management unit determines that the reporting application's geofence is not suitable for blending (i.e., determination block 1306="No"), the geofence management unit may send unblended geofence information to the reporting application in block 1304. In an embodiment, the geofence management unit may determine not to blend the multiple geofences when the reporting application's geofence is not included in the multiple geofences suitable for blending. In such an embodiment, the geofence management unit may only send updated geofence information for the reporting application's geofences. The geofence management unit may execute the embodiment process in a continuous loop returning to block 1202 of method 1200 described above with reference to FIG. 12 so that the geofence management unit may monitor for a geofence crossing notification from another reporting application.

When the geofence management unit determines that the reporting application's geofence is suitable for blending (i.e., determination block 1306="Yes"), the geofence management unit may send the blended geofence to the reporting application in block 1208 as described above with reference to FIG. 12.

The geofence management unit may execute the embodiment process in a continuous loop returning to block 1202 of method 1200 described above with reference to FIG. 12 so that the geofence management unit may monitor for a geofence crossing notification from another reporting application.

Figure 14A:
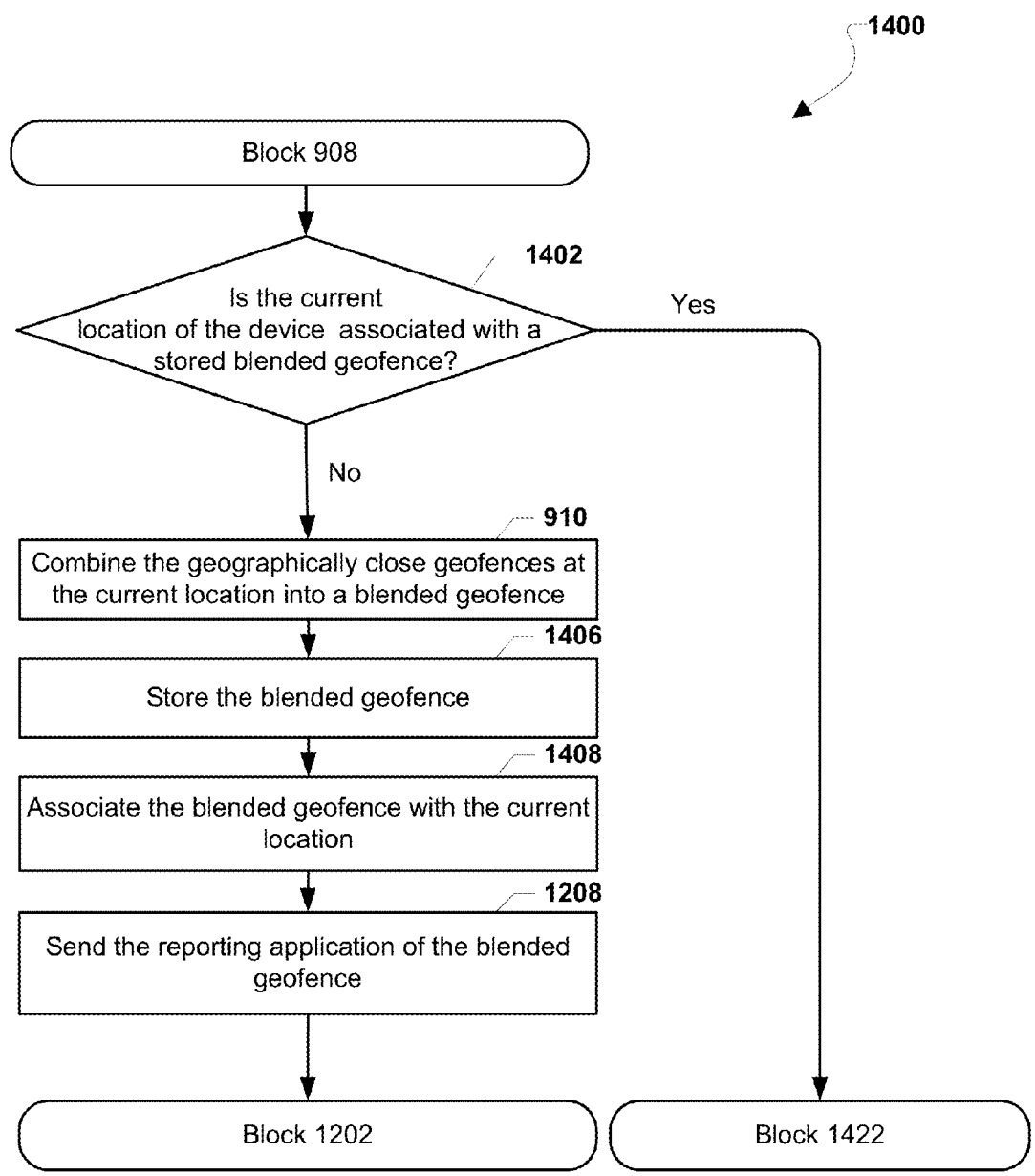
FIGS. 14A and 14B are process flow diagrams illustrating an embodiment method for generating and storing a blended geofence associated with a computing device's current location with a geofence management unit and sending a stored blended geofence associated with a current location to a reporting application.
Figure 14B:
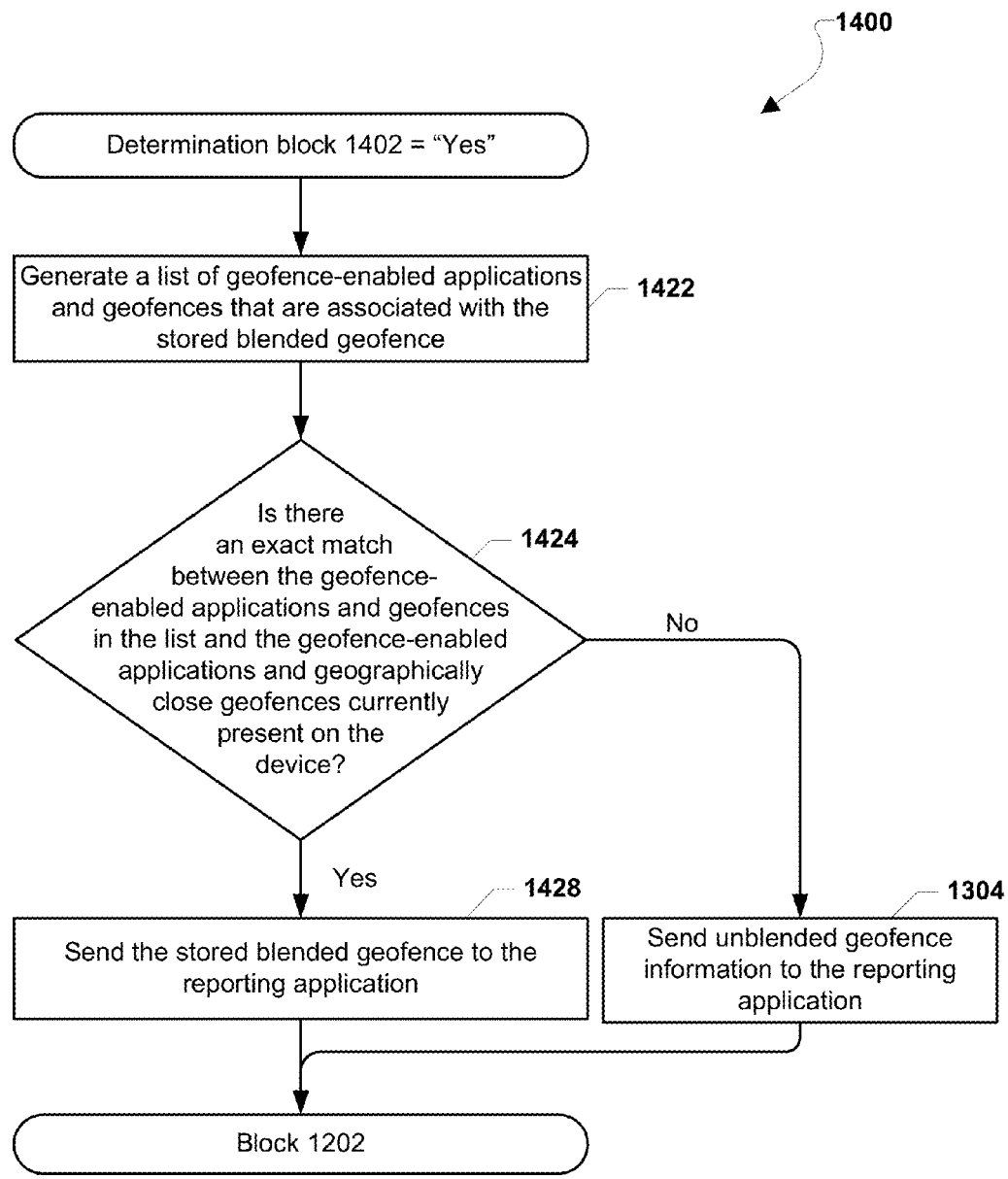

FIGS. 14A and 14B illustrate an embodiment method 1400 that may be implemented by a geofence management unit operating on a computing device for generating stored blended geofences and sending stored blended geofences to a reporting application when there is a blended geofence stored with the computing device's current location. The operations of method 1400 implement an embodiment of the operations of method 1200 described above with reference to FIG. 12. Thus, the geofence management unit may begin performing method 1400 after determining the geofences at the current location that are geographically close in block 908 of method 1200 described above with reference to FIG. 12.

Referring to FIG. 14A, in determination block 1402, the geofence management unit may determine whether the current location of the computing device is associated with a stored blended geofence. In an embodiment, the geofence management unit may associate previously generated blended geofences with a particular area for later use by geofence-enabled applications on the computing device. In other words, the geofence management unit may reuse a blended geofence for the same area without having to generate the blended geofence from scratch for each geofence-enabled application on the computing device as described above with reference to FIGS. 7A and 7B. When the geofence management unit determines that the current location of the computing device is associated with a stored blended geofence (i.e., determination block 1402="Yes"), the geofence management unit may perform the operations in block 1422 described below with reference to FIG. 14B.

When the geofence management unit determines that the current location of the computing device is not associated with a stored blended geofence (i.e., determination block 1402="No"), the geofence management unit may combine geographically close geofences at the current location into a blended geofence in block 910 as described above with reference to FIG. 9A. For example, the geofence management unit may combine the geofences into a blended geofence that includes most or all of the geofences' areas.

In block 1406, the geofence management unit may store the blended geofence. In an embodiment, the geofence management unit may store the blended geofence in a non-volatile memory included in the computing device. In block 1408, the geofence management unit may associate the blended geofence with the current location of the computing device. Thus, as described above with reference to determination block 1402, the geofence management unit may be able to recall the stored blended geofence for the computing device's current location to send to other geofence-enabled applications in the future without having to re-blend the geofences.

In block 1208, the geofence management unit may send the blended geofence to the reporting application as described above with reference to FIG. 12. In another embodiment (not shown), the geofence management unit may send the blended geofence to each geofence-enabled application operating on the computing device. In a further embodiment (not shown), the geofence management unit may only send the blended geofence to geofence-enabled applications that currently have geofences associated with the blended geofence.

The geofence management unit may execute the embodiment method 1200 process in a continuous loop by performing the operations in block 1202 as described above with reference to FIG. 12 so that the geofence management unit may monitor for a geofence crossing notification from another reporting application.

Referring to FIG. 14B, when the geofence management unit determines that the current location of the computing device is associated with a stored blended geofence (i.e., determination block 1402="Yes"), the geofence management unit may generate a list of geofence-enabled applications and their geofences that are associated with the stored blended geofence in block 1422. As described above, the stored blended geofence may be associated with a particular combination of geofence-applications and their respective geofences.

As described above with reference to FIGS. 7A and 7B, a stored blended geofence may only be useful when the stored blended geofence accurately reflects the geographically close geofences and geofence-enabled applications associated with those geographically close geofences that are currently present on the computing device. For instance, the geofence-enabled applications and/or geofences on a computing device are added, removed, or changed after the geofence management unit has stored a blended geofence, thereby making the stored blended geofence out of date and possibly misrepresentative of the geographically close geofences in the current location. For example, the geofence management unit may generate and store a blended geofence for geofences 7, 8, and 9 of geofence-enabled applications X, Y, and Z, respectively. However, the computing device's user may uninstall geofence-enabled application Y, thereby making the previously stored blended geofence for geofence-enabled applications X, Y, and Z unsuitable for use with the current applications and geofences present on the computing device.

Therefore, in determination block 1424, the geofence management unit may determine whether there is an exact match between the geofence-enabled applications and geofences in the list and the geofence-enabled applications and geographically close geofences currently present on the computing device. The geofence management unit may perform this operation by comparing the geofence-enabled applications in the list with the geofence-enabled applications identified in block 902 of method 1200 described with reference to FIG. 12. Similarly, the geofence management unit may compare the geofences in the list with the geofences associated with those geofence-enabled applications determined to be geographically close in the operations of block 908 of method 1200 described above with reference to FIG. 12.

When the geofence management unit determines that there is not an exact match (i.e., determination block 1424="No"), the geofence management unit may send unblended geofence information to the reporting application in block 1304. In other words, even though there is a blended geofence associated with the current location of the reporting application's computing device, the reporting application may not receive the blended geofence when there is not an exact match between the geofence-enabled applications and geofences on the computing device and those included in the list. The geofence management unit may execute the embodiment method 1200 process in a continuous loop by performing the operations in block 1202 as described above with reference to FIG. 12 so that the geofence management unit continuously monitors whether it has received a geofence crossing notification from another reporting application.

When the geofence management unit determines that there is an exact match (i.e., determination block 1424="Yes"), the geofence management unit may send the stored blended geofence to the reporting application in block 1428, and return to performing the operations in block 1202 of method 1200 as described above with reference to FIG. 12 so that the geofence management unit continuously monitors whether it has received a geofence crossing notification from another reporting application.

Figure 15A:
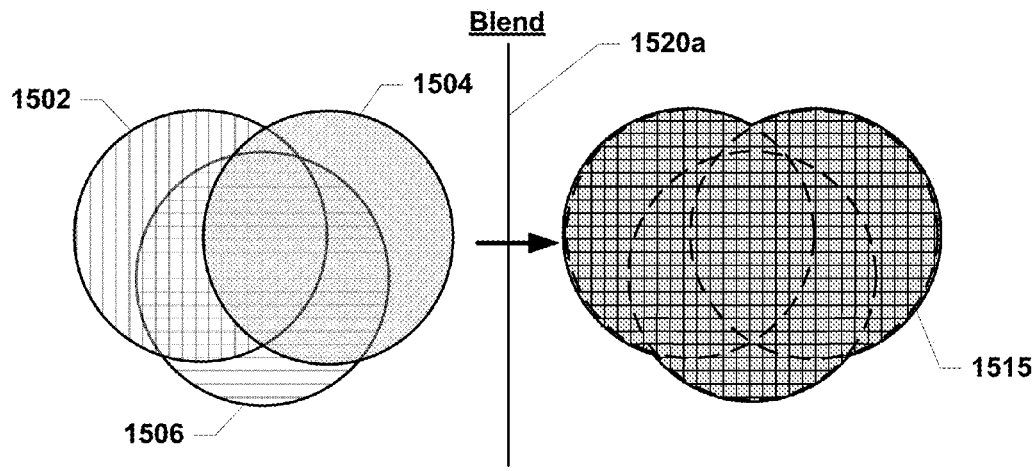
FIGS. 15A-15C are illustrations of combining geographically close geofences into a blended geofence.
Figure 15B:
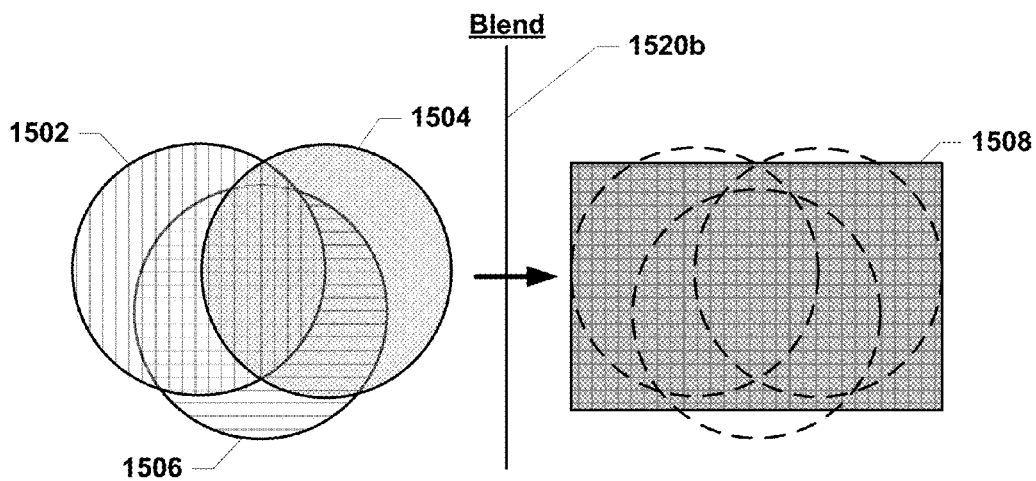
Figure 15C:
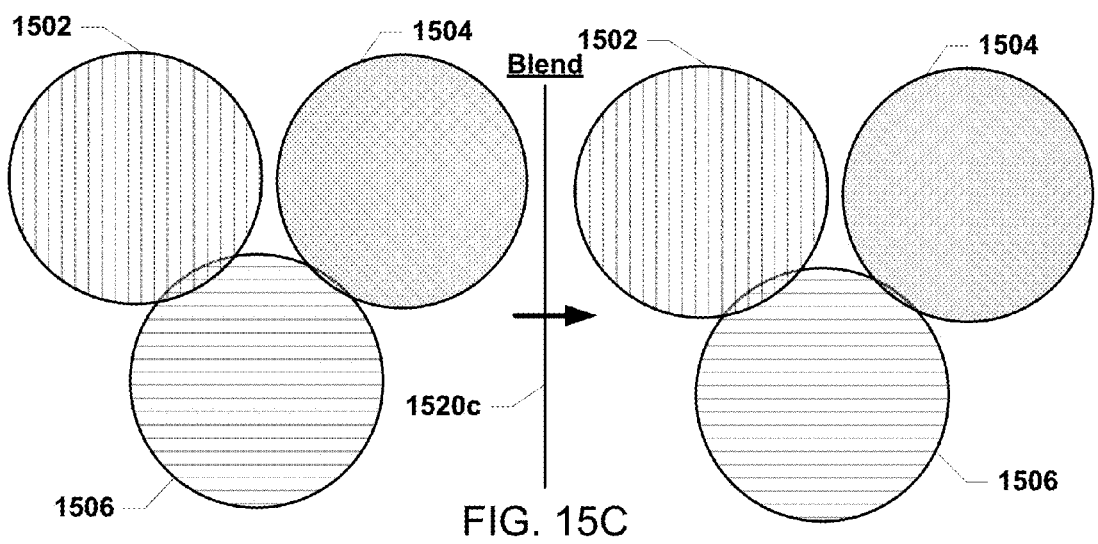

FIGS. 15A-15C are illustrations of various strategies for combining geofences into a single, blended geofence.

In an embodiment, when generating a blended geofence from multiple geofences, the geofence server or a geofence management unit may analyze the pattern of the geofences that are in close proximity/overlapping and create a blended geofence that balances the workload for the computing device (i.e., reducing the usage of location-sensing radios and/or number of server communications) without greatly affecting the general usefulness of the geofences by maintaining an effective granularity (e.g. by not losing too much precision). For example, the geofence server may not generate a massive blended geofence the size of a city because, while it would reduce the usage of location-sensing radios and/or the number of server communications, the massive geofence area would have very limited utility to each application because the accuracy of location-based services would be greatly impacted. Thus, in an embodiment, the geofence server and/or the geofence management unit may generate blended geofences in such a way as to balance the workload of the computing device (e.g., usage of location-sensing radios and/or the number of communications with the server) with the usefulness of the blended geofence (e.g., its ability to facilitate functional location-based services).

In an embodiment, a geofence server or a geofence management unit operating on a computing device may determine that three geofence areas 1502, 1504, 1506 exist and overlap in the same location, and the geofence server or a geofence management unit may perform various calculations to determine how to combine the geofence areas 1502, 1504, 1506 to generate a blended geofence that does not unduly and negatively impact the location-based services associated with the geofence areas 1502, 1504, 1506.

In an example illustrated in FIG. 15A, the geofence server or a geofence management unit may perform blending operations 1520a on the geofence areas 1502, 1504, 1506 to create a blended geofence 1515 based on the perimeters of geofence areas 1502, 1504, 1506. In an embodiment, the geofence server or a geofence management unit may choose to generate a blended geofence 1515 based on geofence perimeters when there is a substantial overlap among the geofences as impact to the location-based services may be marginally affected while greatly lessening the workload of the computing device in terms of usage of location-sensing radios and/or communication with the geofence server.

In another example illustrated in FIG. 15B, the geofence server or a geofence management unit may perform blending operations 1520b on geofence areas 1502, 1504, 1506 to generate a blended geofence 1508 (e.g., a rectangle) based on weighted averages of the areas of the geofence areas 1502, 1504, 1506. In such an example, the blended geofence 1508 may lose some location-based accuracy, but taking the weighted averages may sufficiently reduce the usage of location-sensing radios and/or number of communications made to the geofence server.

In yet another example illustrated in FIG. 15C, the geofence server or a geofence management unit may perform blending operations 1520c on geofence areas 1502, 1504, 1506 and may determine not to generate a blended geofence even though the geofence areas 1502, 1504, 1506 overlap slightly. In this example, the blended geofence would need to be significantly larger than the geofence areas 1502, 1504, 1506 to sufficiently cover the areas of the geofence areas 1502, 1504, 1506. Therefore, any blended geofence for the geofence areas 1502, 1504, 1506 would greatly reduce the accuracy of location-based services. In other words, the geofence server and/or the geofence management unit may determine that the geofence areas 1502, 1504, 1506 are unsuitable for blending.

Figure 16:
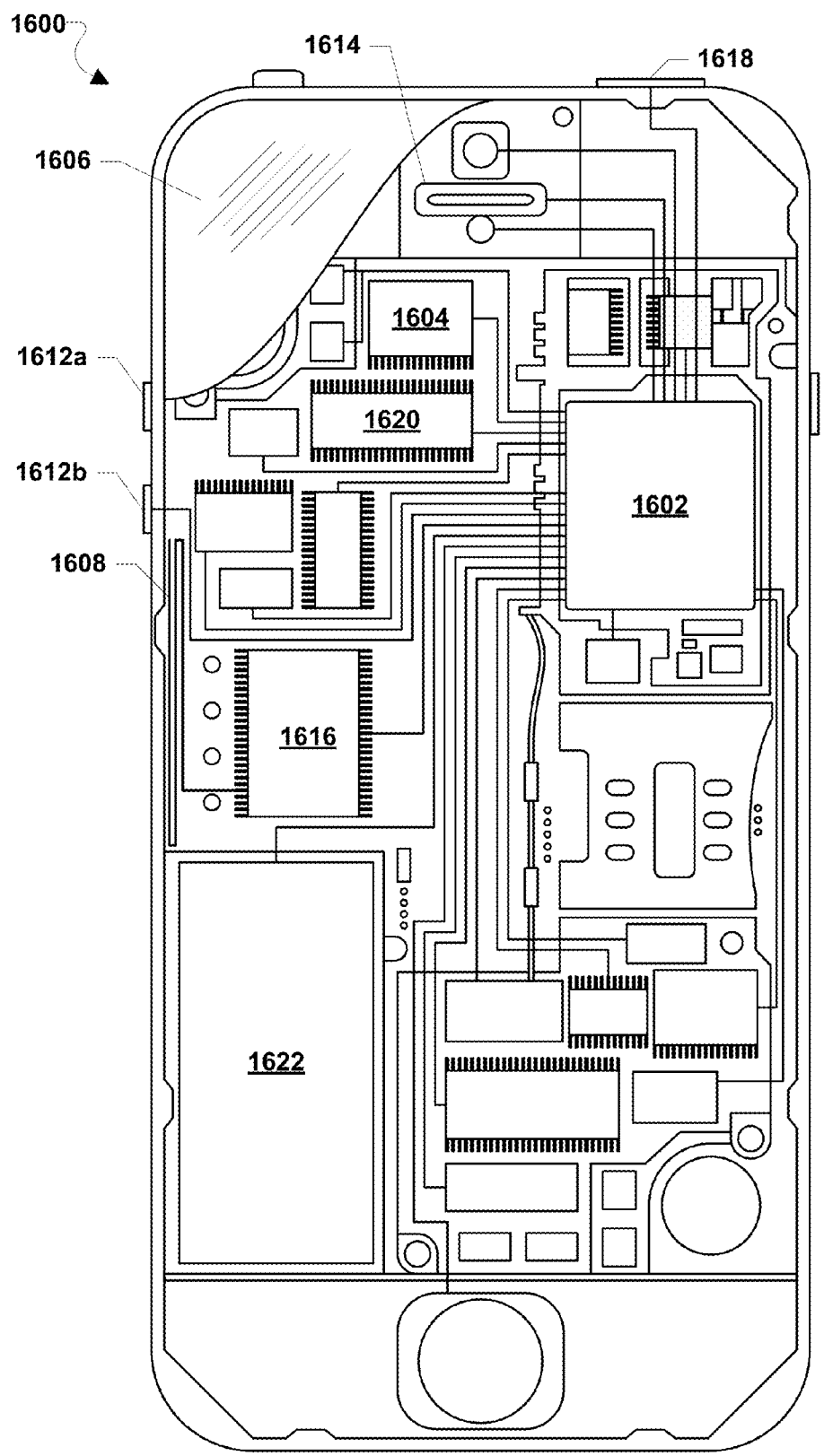
FIG. 16 is a component block diagram of a computing device suitable for use in an embodiment.

The various embodiments may be implemented in any of a variety of computing devices, an example of which is illustrated in FIG. 16. For example, the computing device 1600 may include a processor 1602 coupled to internal memory 1604. Internal memory 1604 may be volatile or non-volatile memory, and may also be secure and/or encrypted memory, or unsecure and/or unencrypted memory, or any combination thereof. The processor 1602 may also be coupled to a touch screen display 1606, such as a resistive-sensing touch screen, capacitive-sensing touch screen infrared sensing touch screen, or the like. Additionally, the display of the computing device 1600 need not have touch screen capability. Additionally, the computing device 1600 may have one or more antenna 1608 for sending and receiving electromagnetic radiation that may be connected to a wireless data link and/or cellular telephone transceiver 1616 coupled to the processor 1602. The computing device 1600 may also include physical buttons 1612a and 1612b for receiving user inputs. The computing device 1600 may also include a power button 1618 for turning the computing device 1600 on and off. The computing device 1600 may optionally have a GPS transceiver 1620 for determining the geographic location of the computing device. The computing device 1600 may be powered by a battery 1622 coupled to the various electronic components. The computing device 1600 may also include speakers 1614 for providing audio outputs.

Figure 17:
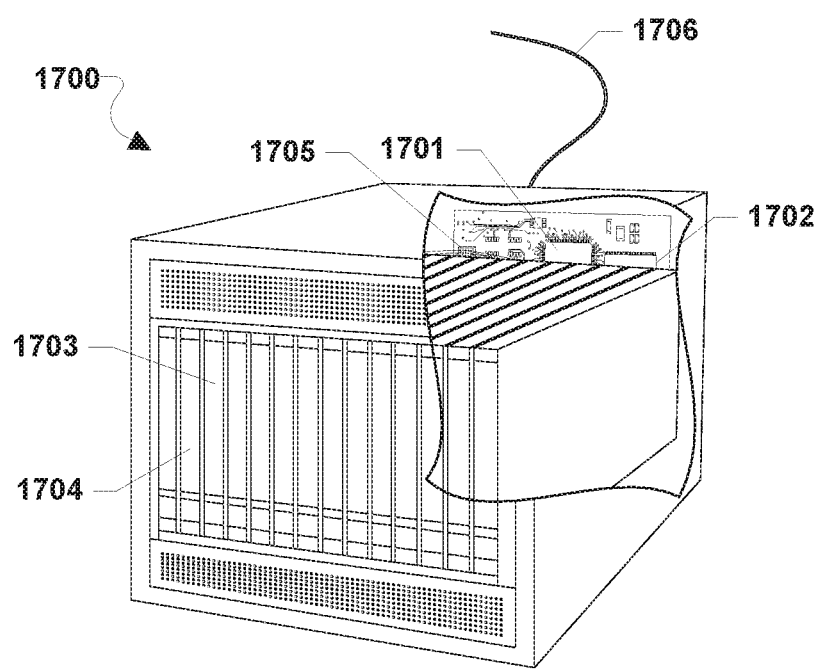
FIG. 17 is a component block diagram of a network server computing device suitable for use in an aspect.

Portions of the embodiment methods may be accomplished in a client-server architecture with some of the processing occurring in a server, such as maintaining databases of normal operational behaviors, which may be accessed by a computing device processor while executing the embodiment methods. Such embodiments may be implemented on any of a variety of commercially available server computing devices, such as the server 1700 illustrated in FIG. 17. Such a server 1700 typically includes a processor 1701 coupled to volatile memory 1702 and a large capacity nonvolatile memory, such as a disk drive 1703. The server 1700 may also include a floppy disc drive, compact disc (CD) or DVD disc drive 1704 coupled to the processor 1701. The server 1700 may also include network access ports 1705 coupled to the processor 1701 for establishing data connections with a network 1706, such as a local area network coupled to other broadcast system computers and servers. The processor 1701 may be any programmable microprocessor, microcomputer or multiple processor chip or chips that can be configured by software instructions (applications) to perform a variety of functions, including the functions of the various embodiments described above. Typically, software applications may be stored in the internal memory 1702, 1703 before they are accessed and loaded into the processor 1701. The processor 1701 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

As used in this application, the terms "component," "unit," "controller," "system," "engine," "generator," "manager," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a programming computing device and the programming computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic circuit, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage computing devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing geofence-enabled applications executing on a computing device, comprising:
 identifying geofences that are associated with different geofence-enabled applications executing on the computing device and that are geographically close together;

comparing metadata of the identified geofences that are associated with the different geofence-enabled applications to determine whether the identified geofences are geofence types that are compatible to combine into a blended geofence;

combining the identified geofences that are geographically close together into the blended geofence in response to determine that the identified geofences are geofence types that are compatible to combine into the blended geofence; and enabling each geofence-enabled application associated with a geofence included in the blended geofence to be informed when the blended geofence is crossed, wherein enabling each geofence-enabled application associated with a goefence to be informed when the blended geofence is crossed comprises replacing the identified geofences associated with the geofence-enabled applications with the blended geofence.

2. The method of claim 1, further comprising determining whether each of the identified geofences that are geographically close together is permitted to be blended by an associated geofence-enabled application, wherein combining the identified geofences that are geographically close together into a blended geofence comprises combining into a blended geofence the identified geofences that are geographically close together and permitted to be blended.

3. The method of claim 1, wherein combining the identified geofences that are geographically close together into a blended geofence comprises combining into a blended geofence, in a geofence server, geofences that are associated with geofence-enabled applications and that are geographically close together, the method further comprising determining whether there is an exact match between geofence-enabled applications in a list of geofence-enabled applications executing on the computing device and the geofence-enabled applications associated with the geofences included in the blended geofence, wherein enabling each geofence-enabled application associated with a geofence included in the blended geofence to be informed when the blended geofence is crossed comprises:

sending the blended geofence to the computing device in response to determining that there is an exact match between the geofence-enabled applications in the list of geofence-enabled applications executing on the computing device and the geofence-enabled applications associated with the blended geofence and the computing device providing the blended geofence to each geofence-enabled application executing on the computing device that is associated with a geofence included in the blended geofence; and sending unblended geofence information to the computing device in response to determining that there is not an exact match between the geofence-enabled applications in the list of geofence-enabled applications executing on the computing device and the geofence-enabled applications associated with the blended geofence.

4. The method of claim 1, wherein enabling each geofence-enabled application associated with a geofence included in the blended geofence to be informed when the blended geofence is crossed comprises:

receiving with a geofence management unit the blended geofence from a geofence server, wherein the geofence management unit is a proxy server application operating on the computing device;

determining whether the blended geofence has been crossed with the geofence management unit on behalf of each geofence-enabled application associated with a geofence included in the blended geofence; and notifying with the geofence management unit each of the geofence-enabled applications associated with a geofence included in the blended geofence in response to determining that the blended geofence has been crossed.

5. The method of claim 1, wherein enabling each geofence-enabled application associated with a geofence included in the blended geofence to be informed when the blended geofence is crossed comprises:

determining a current location of the computing device;

determining whether the computing device has crossed the blended geofence; and notifying each geofence-enabled application associated with a geofence included in the blended geofence when the blended geofence is crossed, wherein:

identifying geofences associated with geofence-enabled applications executing on the computing device that are geographically close together comprises identifying geofences associated with geofence-enabled applications executing on the computing device that are geographically close to the current location of the computing device; and combining the identified geofences that are geographically close together into a blended geofence comprises combining the identified geofences that are geographically close to the current location into a blended geofence.

6. The method of claim 5, further comprising notifying a geofence server when the blended geofence is crossed on behalf of each geofence-enabled application associated with a geofence included in the blended geofence.

7. The method of claim 5, wherein combining the identified geofences that are geographically close to the current location into a blended geofence comprises combining, in a geofence server, the geofences that are geographically close to the current location into a blended geofence, and wherein:

determining a current location of the computing device comprises receiving, in the geofence server, the current location of the computing device in a message from the computing device;

identifying geofences that are associated with geofence-enabled applications executing on the computing device and that are geographically close to the current location comprises:

receiving in the geofence server from the computing device a list of geofence-enabled applications executing on the computing device; and identifying geofences associated with listed geofence-enabled applications that are geographically close to the received current location of the computing device; and enabling each geofence-enabled application associated with a geofence included in the blended geofence to be informed when the blended geofence is crossed comprises sending the blended geofence from the geofence server to the computing device and the computing device providing the blended geofence to each geofence-enabled application associated with a geofence included in the blended geofence.

8. The method of claim 7, further comprising determining whether each of the identified geofences that are geographically close to the current location is permitted to be blended by an associated geofence-enabled application,
wherein combining, in a geofence server, the geofences that are geographically close to the current location into a blended geofence comprises combining into a blended geofence the identified geofences that are geographically close to the current location and permitted to be blended.

9. A computing device, comprising:
a memory;
a transceiver; and
a processor coupled to the memory and the transceiver, the processor configured with processor-executable instructions to perform operations comprising:
identifying geofences that are associated with different geofence-enabled applications executing on the computing device and that are geographically close together;
comparing metadata of the identified geofences that are associated with the different geofence-enabled applications to determine whether the identified geofences are geofence types that are compatible to combine into a blended geofence;
combining the identified geofences that are geographically close together into the blended geofence in response to determining that the identified geofences are geofence types that are compatible to combine into the blended geofence; and
enabling each geofence-enabled application associated with a geofence included in the blended geofence to be informed when the blended geofence is crossed, wherein enabling each geofence-enabled application associated with a geofence included in the blended geofence to be informed when the blended geofence is crossed comprises replacing the identified geofences associated with the geofence-enabled applications with the blended geofence.

10. The computing device of claim 9, wherein:
the processor is configured with processor-executable instructions to perform operations further comprising determining whether each of the identified geofences that are geographically close together is permitted to be blended by an associated geofence-enabled application; and
the processor is configured with processor-executable instructions to perform operations such that combining the identified geofences that are geographically close together into a blended geofence comprises combining into a blended geofence the identified geofences that are geographically close together and permitted to be blended.

11. The computing device of claim 9, wherein:
the processor is configured with processor-executable instructions to perform operations further comprising determining whether there is an exact match between geofence-enabled applications in a list of geofence-enabled applications executing on the computing device and the geofence-enabled applications associated with geofences included in the blended geofence; and
the processor is configured with processor-executable instructions to perform operations such that enabling each geofence-enabled application associated with a geofence included in the blended geofence to be informed when the blended geofence is crossed comprises:
providing the blended geofence to each geofence-enabled application executing on the computing device that is associated with a geofence included in the blended geofence in response to determining that there is an exact match between the geofence-enabled applications in the list of geofence-enabled applications executing on the computing device and the geofence-enabled applications associated with the blended geofence; and
providing unblended geofence information to each geofence-enabled application executing on the computing device that is associated with a geofence included in the blended geofence in response to determining that there is not an exact match between the geofence-enabled applications in the list of geofence-enabled applications executing on the computing device and the geofence-enabled applications associated with the blended geofence.

12. The computing device of claim 9, wherein the processor is configured with processor-executable instructions to perform operations such that enabling each geofence-enabled application associated with a geofence included in the blended geofence to be informed when the blended geofence is crossed comprises providing the blended geofence to each geofence-enabled application associated with a geofence included in the blended geofence.

13. The computing device of claim 9, wherein the processor is configured with processor-executable instructions to perform operations such that enabling each geofence-enabled application associated with a geofence included in the blended geofence to be informed when the blended geofence is crossed comprises:
receiving with a geofence management unit the blended geofence from a geofence server, wherein the geofence management unit is a proxy server application operating on the computing device;
determining whether the blended geofence has been crossed with the geofence management unit on behalf of each geofence-enabled application associated with a geofence included in the blended geofence; and
notifying with the geofence management unit each of the geofence-enabled applications associated with a geofence included in the blended geofence in response to determining that the blended geofence has been crossed.

14. The computing device of claim 9, wherein the processor is configured with processor-executable instructions to perform operations such that:
enabling each geofence-enabled application associated with a geofence included in the blended geofence to be informed when the blended geofence is crossed comprises:
determining a current location of the computing device;
determining whether the computing device has crossed the blended geofence; and
notifying each geofence-enabled application associated with a geofence included in the blended geofence when the blended geofence is crossed;
identifying geofences associated with geofence-enabled applications executing on the computing device that are geographically close together comprises identifying geofences associated with geofence-enabled applications executing on the computing device that are geographically close to the current location of the computing device; and combining the identified geofences that are geographically close together into a blended geofence comprises combining the identified geofences that are geographically close to the current location into a blended geofence.

15. The computing device of claim 14, the processor is configured with processor-executable instructions to perform operations further comprising notifying a geofence server when the blended geofence is crossed on behalf of each geofence-enabled application associated with a geofence included in the blended geofence.

16. The computing device of claim 14, wherein:
the processor is configured with processor-executable instructions to perform operations further comprising determining whether each of the identified geofences that are geographically close to the current location is permitted to be blended by an associated geofence-enabled application; and
the processor is configured with processor-executable instructions to perform operations such that combining the identified geofences that are geographically close to the current location into a blended geofence comprises combining into a blended geofence the identified geofences that are geographically close to the current location and permitted to be blended.

17. A geofence server, comprising:
a server processor configured with server-executable instructions to perform operations comprising:
identifying geofences that are associated with different geofence-enabled applications executing on a computing device and that are geographically close together;
comparing metadata of the identified geofences that are associated with the different geofence-enabled applications to determine whether the identified geofences are geofence types that are compatible to combine into a blended geofence;
combining the identified geofences that are geographically close together into the blended geofence in response to determining that the identified geofences are geofence types that are compatible to combine into the blended geofence; and
enabling each geofence-enabled application associated with a geofence included in the blended geofence to be informed when the blended geofence is crossed, wherein enabling each geofence-enabled application associated with a geofence included in the blended geofence to be informed when the blended geofence is crossed comprises replacing the identified geofences associated with the geofence-enabled applications with the blended geofence.

18. The geofence server of claim 17, wherein:
the server processor is configured with server-executable instructions to perform operations further comprising determining whether each of the identified geofences that are geographically close together is permitted to be blended by an associated geofence-enabled application,
the server processor is configured with server-executable instructions to perform operations such that combining the identified geofences that are geographically close together into a blended geofence comprises combining into a blended geofence the identified geofences that are geographically close together and permitted to be blended.

19. The geofence server of claim 17, wherein:
the server processor is configured with server-executable instructions to perform operations such that combining the identified geofences that are geographically close together into a blended geofence comprises combining into a blended geofence geofences that are associated with geofence-enabled applications and that are geographically close together;
the server processor is configured with server-executable instructions to perform operations further comprising determining whether there is an exact match between geofence-enabled applications in a list of geofence-enabled applications executing on the computing device and the geofence-enabled applications associated with geofences included in the blended geofence; and
the server processor is configured with server-executable instructions to perform operations such that enabling each geofence-enabled application associated with a geofence included in the blended geofence to be informed when the blended geofence is crossed comprises:
sending the blended geofence to the computing device in response to determining that there is an exact match between the geofence-enabled applications in the list of geofence-enabled applications executing on the computing device and the geofence-enabled applications associated with the blended geofence and the computing device providing the blended geofence to each geofence-enabled application executing on the computing device that is associated with a geofence included in the blended geofence; and
sending unblended geofence information to the computing device in response to determining that there is not an exact match between the geofence-enabled applications in the list of geofence-enabled applications executing on the computing device and the geofence-enabled applications associated with the blended geofence.

20. The geofence server of claim 17, wherein:
the server processor is configured with server-executable instructions to perform operations such that enabling each geofence-enabled application associated with a geofence included in the blended geofence to be informed when the blended geofence is crossed comprises:
determining a current location of the computing device;
determining whether the computing device has crossed the blended geofence; and
notifying each geofence-enabled application associated with a geofence included in the blended geofence when the blended geofence is crossed; and
the server processor is configured with server-executable instructions to perform operations such that:
identifying geofences associated with geofence-enabled applications executing on the computing device that are geographically close together comprises identifying geofences associated with geofence-enabled applications executing on the computing device that are geographically close to the current location of the computing device; and
combining the identified geofences that are geographically close together into a blended geofence comprises combining the identified geofences that are geographically close to the current location into a blended geofence.

21. The geofence server of claim 20, wherein the server processor is configured with server-executable instructions to perform operations such that:
  determining a current location of the computing device comprises receiving the current location of the computing device in a message from the computing device;
  identifying geofences that are associated with geofence-enabled applications executing on the computing device and that are geographically close to the current location comprises:
    receiving from the computing device a list of geofence-enabled applications executing on the computing device; and
    identifying geofences associated with listed geofence-enabled applications that are geographically close to the received current location of the computing device; and
  enabling each geofence-enabled application associated with a geofence included in the blended geofence to be informed when the blended geofence is crossed comprises sending the blended geofence to the computing device.

22. The geofence server of claim 21, wherein:
  the server processor is configured with server-executable instructions to perform operations further comprising determining whether each of the identified geofences that are geographically close to the current location is permitted to be blended by an associated geofence-enabled application; and
  the server processor is configured with server-executable instructions to perform operations such that combining the identified geofences that are geographically close to the current location into a blended geofence comprises combining into a blended geofence the identified geofences that are geographically close to the current location and permitted to be blended.

23. A system, comprising:
  a geofence server comprising a server processor; and
  a computing device comprising:
    a memory;
    a transceiver configured to communicate with a network coupled to the geofence server; and
    a computing device processor coupled to the memory and the transceiver, configured with processor-executable instructions to perform operations comprising:
      identifying different geofence-enabled applications executing on the computing device; and
      sending a list of the identified geofence-enabled applications to the geofence server;
  the server processor is configured with server-executable instructions to perform operations comprising:
    receiving the list of the identified geofence-enabled applications from the computing device;
    identifying geofences that are associated with listed geofence-enabled applications and that are geographically close together;
    comparing metadata of the identified geofences that are associated with the listed geofence-enabled applications to determine whether the identified geofences are geofence types that are compatible to combine into a blended geofence;
    combining the identified geofences that are geographically close together into the blended geofence in response to determining that the identified geofences are geofence types that are compatible to combine into the blended geofence; and
    sending the blended geofence to the computing device; and
  the computing device processor is configured with processor-executable instructions to perform operations further comprising:
    receiving the blended geofence from the geofence server; and
    enabling each geofence-enabled application associated with a geofence included in the blended geofence to be informed when the blended geofence is crossed, wherein enabling each geofence-enabled application associated with a geofence included in the blended geofence to be informed when the blended geofence is crossed comprises replacing the identified geofences associated with the geofence-enabled applications with the blended geofence.

24. The system of claim 23, wherein:
  the server processor is configured with server-executable instructions to perform operations further comprising determining whether each of the identified geofences that are geographically close together is permitted to be blended by an associated geofence-enabled application; and
  wherein the server processor is configured with server-executable instructions to perform operations such that combining the identified geofences that are geographically close together into a blended geofence comprises combining into a blended geofence the identified geofences that are geographically close together and permitted to be blended.

25. The system of claim 23, wherein:
  the server processor is configured with server-executable instructions to perform operations further comprising determining whether there is an exact match between geofence-enabled applications in the list of the identified geofence-enabled applications and geofence-enabled applications associated with geofences included in the blended geofence; and
  the server processor is configured with server-executable instructions to perform operations such that sending the blended geofence to the computing device comprises:
    sending the blended geofence to the computing device in response to determining that there is an exact match between the geofence-enabled applications in the list of the identified geofence-enabled applications executing on the computing device and the geofence-enabled applications associated with the blended geofence; and
    sending unblended geofence information to the computing device in response to determining that there is not an exact match between the geofence-enabled applications in the list of the identified geofence-enabled applications executing on the computing device and the geofence-enabled applications associated with the blended geofence.

26. The system of claim 23, wherein the computing device processor is configured with processor-executable instructions to perform operations such that:
  receiving a blended geofence from the geofence server comprises receiving with a geofence management unit the blended geofence from the geofence server, wherein the geofence management unit is a proxy server application operating on the computing device; and enabling each geofence-enabled application associated with a geofence included in the blended geofence to be informed when the blended geofence is crossed comprises:
- determining whether the blended geofence has been crossed with the geofence management unit on behalf of each geofence-enabled application associated with a geofence included in the blended geofence; and
- notifying with the geofence management unit each of the geofence-enabled applications associated with a geofence included in the blended geofence in response to determining that the blended geofence has been crossed.

27. The system of claim 23, wherein:
the computing device processor is configured with processor-executable instructions to perform operations further comprising:
- determining a current location of the computing device; and
- sending the current location of the computing device to the geofence server;

the server processor is configured with server-executable instructions to perform operations further comprising receiving the current location of the computing device from the computing device; and the server processor is configured with server-executable instructions to perform operations such that:
- identifying geofences that are associated with the listed geofence-enabled applications and that are geographically close together comprises identifying geofences that are associated with listed geofence-enabled applications and that are geographically close to the current location of the computing device; and
- combining the identified geofences that are geographically close together into a blended geofence comprises combining the identified geofences that are geographically close to the current location into a blended geofence.

28. The system of claim 27, wherein the computing device processor is configured with processor-executable instructions to perform operations further comprising notifying the geofence server when the blended geofence is crossed on behalf of each geofence-enabled application associated with a geofence included in the blended geofence.

29. The system of claim 27, wherein:
the server processor is configured with server-executable instructions to perform operations further comprising determining whether each of the identified geofences that are geographically close to the current location is permitted to be blended by an associated geofence-enabled application; and the server processor is configured with server-executable instructions to perform operations such that combining the identified geofences that are geographically close to the current location into a blended geofence comprises combining into a blended geofence the identified geofences that are geographically close to the current location and permitted to be blended.

* * * * *